(12) United States Patent
Ashino

(10) Patent No.: US 9,767,269 B2
(45) Date of Patent: Sep. 19, 2017

(54) SECURITY-FUNCTION-DESIGN SUPPORT DEVICE, SECURITY-FUNCTION-DESIGN SUPPORT METHOD, AND PROGRAM

(71) Applicant: NEC Corporation, Tokyo (JP)

(72) Inventor: Yuki Ashino, Tokyo (JP)

(73) Assignee: NEC Corporation, Tokyo (JP)

( * ) Notice: Subject to any disclaimer, the term of this patent is extended or adjusted under 35 U.S.C. 154(b) by 86 days.

(21) Appl. No.: 14/431,999

(22) PCT Filed: Jul. 18, 2013

(86) PCT No.: PCT/JP2013/069557
§ 371 (c)(1),
(2) Date: Mar. 27, 2015

(87) PCT Pub. No.: WO2014/061326
PCT Pub. Date: Apr. 24, 2014

(65) Prior Publication Data
US 2015/0294107 A1    Oct. 15, 2015

(30) Foreign Application Priority Data
Oct. 15, 2012  (JP) ................................ 2012-228074

(51) Int. Cl.
*G06F 21/57*     (2013.01)
*G06F 21/45*     (2013.01)
(Continued)

(52) U.S. Cl.
CPC .............. *G06F 21/45* (2013.01); *G06F 21/31* (2013.01); *G06F 21/57* (2013.01); *H04L 63/20* (2013.01)

(58) Field of Classification Search
None
See application file for complete search history.

(56) References Cited

U.S. PATENT DOCUMENTS 5,602,916 A * 2/1997 Grube .................... H04L 12/22
                                                              380/270
7,149,896 B1 * 12/2006 Bahl .................. H04L 63/0428
                                                              380/270
(Continued)

FOREIGN PATENT DOCUMENTS

JP    2006-276993 A    10/2006
JP    2006-350399 A    12/2006
(Continued)

OTHER PUBLICATIONS

International Search Report, Corresponding to PCT/JP2013/069557, dated Sep. 10, 2013, 2 pages.

*Primary Examiner* — Malcolm Cribbs
(74) *Attorney, Agent, or Firm* — Wilmer Cutler Pickering Hale and Dorr LLP

(57) ABSTRACT

A display unit displays a configuration of a system in a display device. An implementation scheme configuration support unit provides a candidate of a security implementation scheme configurable for a component of the system and configures a security implementation scheme selected by a user to a component selected by a user. An associated function element configuration support unit provides a candidate of an associated function element configurable for a component of the system and configures an associated function element selected by a user to a component selected by a user. An evaluation unit determines whether or not the associated function element configured for the component of the system is appropriate based on a condition to determine appropriateness of the configuration of the certain associated function element. An output unit outputs a result of the determination by the associated function element evaluation unit.

6 Claims, 20 Drawing Sheets

(51) Int. Cl.
*G06F 21/31* (2013.01)
*H04L 29/06* (2006.01)

(56) References Cited

U.S. PATENT DOCUMENTS

| | | | | |
|---|---|---|---|---|
| 8,856,869 | B1* | 10/2014 | Brinskelle | H04L 63/08 726/12 |
| 9,378,343 | B1* | 6/2016 | David | H04W 4/14 |
| 2002/0087479 | A1* | 7/2002 | Malcolm | G06F 21/606 705/64 |
| 2003/0041251 | A1* | 2/2003 | Kumhyr | G06F 21/31 713/184 |
| 2003/0065604 | A1* | 4/2003 | Gatto | G06Q 40/06 705/36 R |
| 2003/0097570 | A1* | 5/2003 | Wheeler | G06F 21/32 713/180 |
| 2005/0203855 | A1* | 9/2005 | Malcolm | G06F 21/606 705/64 |
| 2005/0209974 | A1* | 9/2005 | Okunseinde | G06Q 20/382 705/64 |
| 2007/0255954 | A1* | 11/2007 | Struik | H04L 63/105 713/171 |
| 2010/0095235 | A1* | 4/2010 | Bennett | G06Q 99/00 715/781 |
| 2010/0146266 | A1* | 6/2010 | Chen | H04L 63/0428 713/160 |
| 2013/0263125 | A1* | 10/2013 | Shamsee | G06F 9/45558 718/1 |

FOREIGN PATENT DOCUMENTS

| | | |
|---|---|---|
| JP | 2011-197799 A | 10/2011 |
| JP | 2011-232874 A | 11/2011 |
| JP | 2012-038108 A | 2/2012 |

* cited by examiner

SECURITY-FUNCTION-DESIGN SUPPORT DEVICE, SECURITY-FUNCTION-DESIGN SUPPORT METHOD, AND PROGRAM

CROSS-REFERENCE TO RELATED APPLICATIONS

The present application is a national stage application of International Application No. PCT/JP2013/069557 entitled "Security-Function-Design Support Device, Security-Function-Design Support Method, and Program" filed on Jul. 18, 2013, which claims the benefit of priority from Japanese Patent Application No. JP2012-228074, filed on Oct. 15, 2012, the disclosures of which are incorporated herein in their entirety by reference thereto.

TECHNICAL FIELD

The present invention relates to a security-function-design support device, a security-function-design support method, and a program.

BACKGROUND ART

Elements of a security-function design of a computer system include a specific measure (a security implementation scheme) for implementing a certain security function (e.g. an entity authentication) and an associated measure (an associated function element) required for functioning the security implementation scheme. The associated function element varies depending on a system configuration. For example, in case that an authentication scheme using a user ID and a password as the security implementation scheme is employed, whether or not encryption of a communication path through which the user ID and the password are transmitted is required varies depending on if the system is online or offline. In other words, in this example, encryption of the communication path is the associated function element. It is necessary that a system designer designs such that associated function elements are selected without excess or deficiency considering the system configuration. For this purpose, the system designer needs to have knowledge of security in general in addition to knowledge of the entire system, and is required great effort. In addition, in case that design of the associated function element is not sufficient, it causes the security function of the entire system not to operate effectively and, as a result, it may become a factor that causes a security accident.

In a security-design support method described in PTL 1, a location on a path, from a location of an agent which becomes a cause of a conceivable threat in a design-target system to a location of an asset which suffers damage by the threat, is assumed to be an arrangement candidate of a security-function requirement. Furthermore, the arrangement of the security-function requirement is facilitated by determining a priority of each arrangement candidate according to a predetermined arrangement rule.

In a security-design support method described in PTL 2, a degree of importance of the security-function requirement is obtained from a risk value of a threat of an information system, a measure policy against the threat, and the security-function requirement of the measure policy against the threat. In addition, information-related products to be introduced into the information system are derived from the degree of importance of the security-function requirement, a degree of association between the security-function requirement and a security function of existing information-related products, and a degree of satisfaction of the security function of the information-related products.

CITATION LIST

Patent Literature

[PTL 1] Japanese Laid-open Patent Publication No. 2006-276993
[PTL 2] Japanese Laid-open Patent Publication No. 2006-350399

SUMMARY OF INVENTION

Technical Problem

However, in the method described in PTL 1, although it is possible to support an arrangement of a security-function requirement, it is impossible to determine appropriateness of an arrangement of the associated function element for implementing the security function.

Furthermore, in the method described in PTL 2, although a security design is supported based on data such as the degree of importance of the security-function requirement, the degree of association with the security function of information-related products, and the degree of satisfaction of the security function of the information-related products, it has been impossible to determine appropriateness of the associated function element based on a condition such as a system configuration.

As described above, in the methods described in PTL 1 and PTL 2, it has been impossible to support configuring the associated function element for executing the implementation scheme of the security function.

An object of the present invention is to provide technology to evaluate appropriateness of the arrangement of the associated function element required for the security implementation scheme, which varies depending on the system configuration, and to support design of the associated function element.

Solution to Problem

A security-function-design support device of the present invention includes:

a system configuration data display unit that displays a configuration of a system in a display device;

an implementation scheme configuration support unit that, in order to implement a security function, provides a candidate of a security implementation scheme configurable for a component of the system and configures a security implementation scheme selected by an operation of a user to a component selected by an operation of a user;

an associated function element configuration support unit that, in order to protect the security implementation scheme, provides a candidate of an associated function element configurable for a component of the system and configures an associated function element selected by an operation of a user to a component selected by an operation of a user;

an associated function element evaluation unit that determines whether or not the associated function element configured for the component of the system is appropriate based on a condition to determine appropriateness of the configuration of the certain associated function element; and an evaluation result output unit that outputs a result of the determination by the associated function element evaluation unit.

Advantageous Effects of Invention

According to the present invention, it is possible to evaluate appropriateness of the arrangement of the associated function element required for the security implementation scheme, which varies depending on the system configuration, and to support design of the associated function element.

DESCRIPTION OF EMBODIMENTS (Security-Function Design)

One of functions which a computer system has is, for example, a function (a provision function) to provide information only to a specific user. However, a malicious third party (an attacker) may illegally operate (attack) the computer system and may obtain information, which is not allowed to be legally obtained, by using the provision function.

Therefore, a function (a security function) to protect the provision function is required in order to protect the provision function from an attacker. In case of designing a system, a designer is required to design where and how the security function is arranged (a security-function design).

In a security-function design, an information asset to be protected is first determined. For example, information to be provided to a specific user may be cited as an information asset.

Next, it is necessary to study the security function required to protect the information asset. For example, making it possible to authenticate a specific user (entity authentication) may be cited.

Next, a scheme (a security implementation scheme) of software or the like necessary to implement the security function is selected. For example, an authentication scheme (an ID/PW authentication) using an ID which is an identification code for identifying a user and a password which is known only to the user may be selected.

Next, since the security implementation scheme itself may be subject to attack by the attacker, a function (an associated function element) to protect the security implementation scheme is also required. For example, in the ID/PW authentication described above, since ID and PW pass back and forth on a communication path, encryption of the communication path is required as the associated function. However, the associated function is not necessary depending on a system configuration. For example, in a computer system which does not have any communication functions, the encryption function of the communication path is not required. Thus, in the security function design, it is necessary to appropriately and without excess or deficiency configure the associated function element which varies depending on the system configuration.

(Configuration of Security-Function-Design Support Device)

Figure 1:
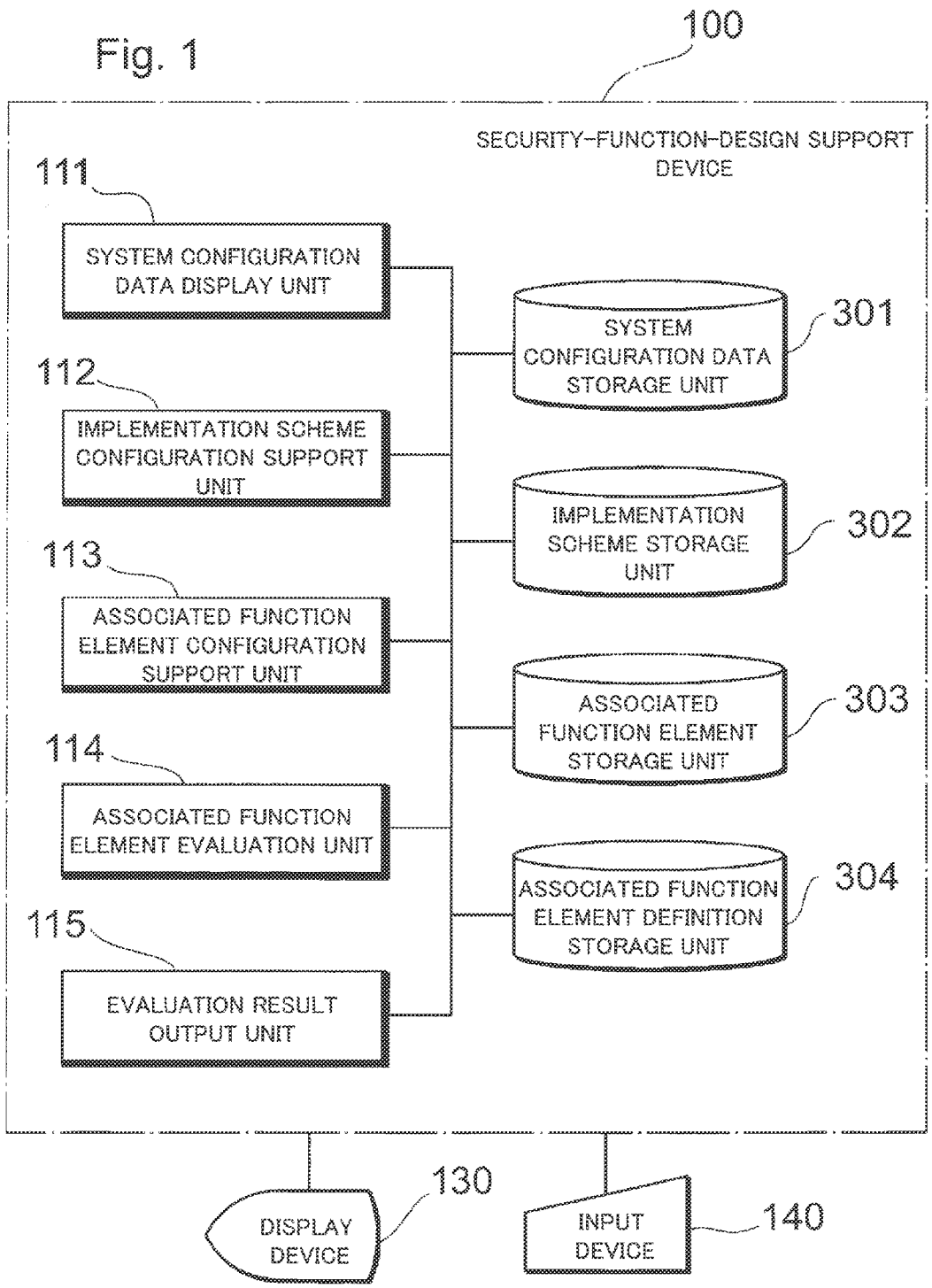
FIG. 1 is a block diagram illustrating a configuration of a security-function-design support device according to an exemplary embodiment of the present invention.

In the following, a configuration of a security-function-design support device according to an exemplary embodiment of the present invention will be described. FIG. 1 is a block diagram illustrating a configuration of a security-function-design support device 100 according to the exemplary embodiment of the present invention. As illustrated, the security-function-design support device 100 includes a system configuration data display unit 111, an implementation scheme configuration support unit 112, an associated function element configuration support unit 113, an associated function element evaluation unit 114, an evaluation result output unit 115, a system configuration data storage unit 301, an implementation scheme storage unit 302, an associated function element storage unit 303, an associated function element definition storage unit 304, a display device 130, and an input device 140.

The security-function-design support device 100 may use a dedicated or general purpose computer including a CPU, a memory such as a ROM and a RAM, an external storage device to store a variety of information, an input interface, an output interface, a communication interface, and a bus for connection thereof. Note that the security-function-design support device 100 may be constituted of a single computer or may be constituted of a plurality of computers connected to each other via communication lines.

The system configuration data display unit 111, the implementation scheme configuration support unit 112, the associated function element configuration support unit 113, the associated function element evaluation unit 114, and the evaluation result output unit 115 correspond to function modules which is implemented by a CPU executing a predetermined program stored in a ROM or the like. The system configuration data storage unit 301, the implementation scheme storage unit 302, the associated function element storage unit 303, and the associated function element definition storage unit 304 are implemented by an external storage device. The external storage device may be connected to the security-function-design support device 100 via a network or the like.

The display device 130 is a display device such as a display, and receives image signals output from the CPU of the security-function-design support device 100 and displays various images.

The input device 140 is various devices including a mouse, a keyboard, and the like and is used so that a user inputs various types of information to the security-function-design support device 100.

Figure 2:
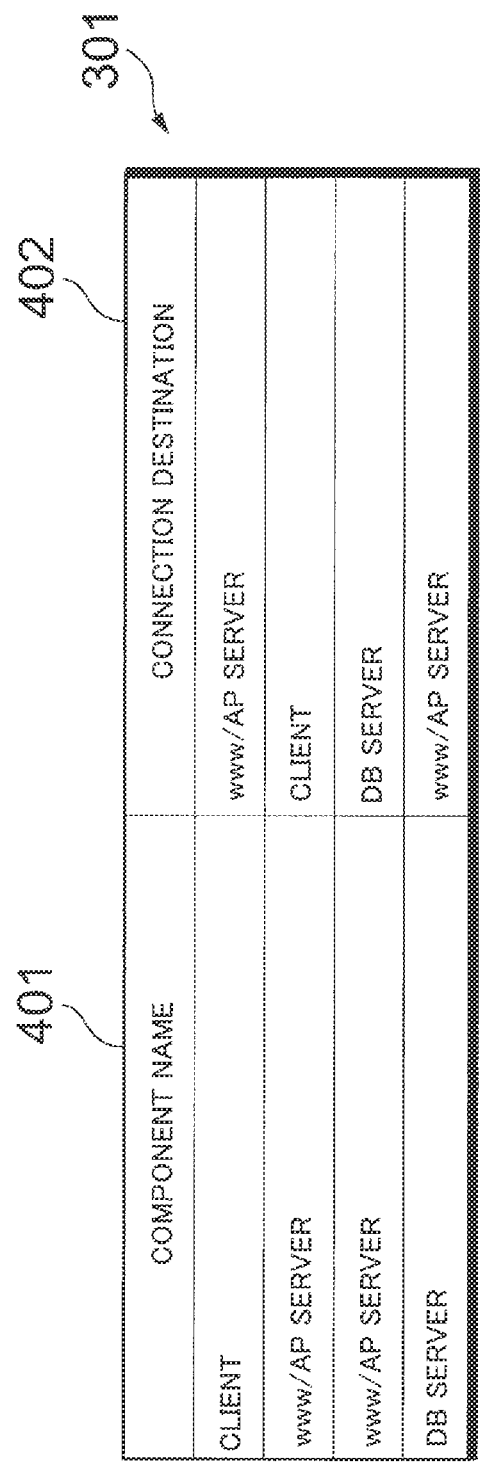
FIG. 2 is a diagram illustrating an example of data stored in a system configuration data storage unit according to the exemplary embodiment of the present invention.

The system configuration data storage unit 301 stores information of a system configuration. FIG. 2 is a diagram illustrating an example of system configuration data stored in the system configuration data storage unit 301. As illustrated in the FIG. 2, the system configuration data includes a component name 401 and a connection destination 402 as data items. The component name 401 is a name of a component configuring a target system to design the security function. The connection destination 402 represents a component connected to each of the components via a communication line.

A system in the example shown in the FIG. 2 is configured by three components (a client, a WWW/AP server, and a DB server), and, connection relationships between the client and the WWW/AP server and the WWW/AP server and the DB server are non-directional. In the system, system configuration data (the client, the WWW/AP server, and the DB server) are provided as the component names 401 and the connection destination 402 of the respective components is recorded, as illustrated in the FIG. 2. In this example, it can be seen that the client and the DB server are connected via the WWW/AP server.

Figure 3:
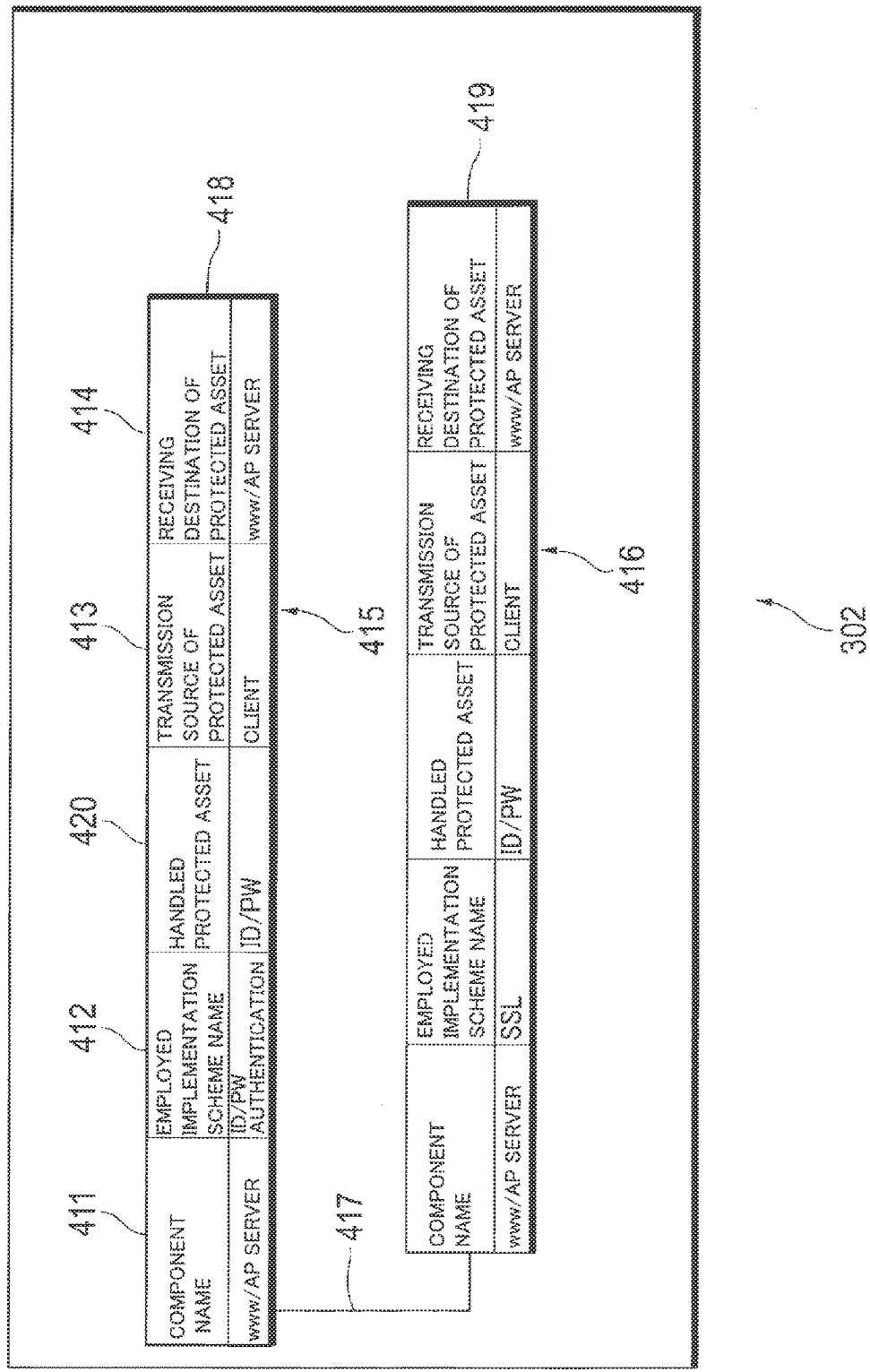
FIG. 3 is a diagram illustrating an example of data stored in an implementation scheme storage unit according to the exemplary embodiment of the present invention.

The implementation scheme storage unit 302 stores data of a security implementation scheme for implementing a security function which is configured for a component of the system. FIG. 3 is a diagram illustrating an example of data stored in the implementation scheme storage unit 302. As illustrated in the FIG. 3, the implementation scheme storage unit 302 includes a table 415 which includes a component name 411, an employed implementation scheme name 412, a protected asset 420 which is handled by the implementation scheme, a transmission source 413 of the protected asset which is handled by the implementation scheme, and a receiving destination 414 of the protected asset which is handled by the implementation scheme.

The table 415 may have a hierarchical structure. For example, in case that the associated function element for protecting a certain security implementation scheme is implemented by other security implementation scheme, a table 416 is generated with a record 418 of the table 415 as a parent and a link structure 417 is provided such that the table 416 can be followed from the parent record 418.

In the example shown in the FIG. 3, a security implementation scheme of the ID/PW authentication is employed in the WWW/AP server. In addition, the protected asset handled by the ID/PW authentication is ID/PW, the transmission source of the protected asset is a client, and the receiving destination of the protected asset is the WWW/AP server (table 415). Furthermore, a security implementation scheme to implement the associated function element of the ID/PW authentication is SSL, the transmission source of the protected asset handled by SSL is the client, and the receiving destination of the protected asset is the WWW/AP server (table 416). In addition, the link structure 417 is provided such that the table 416 can be followed from the parent record 418.

Figure 4:
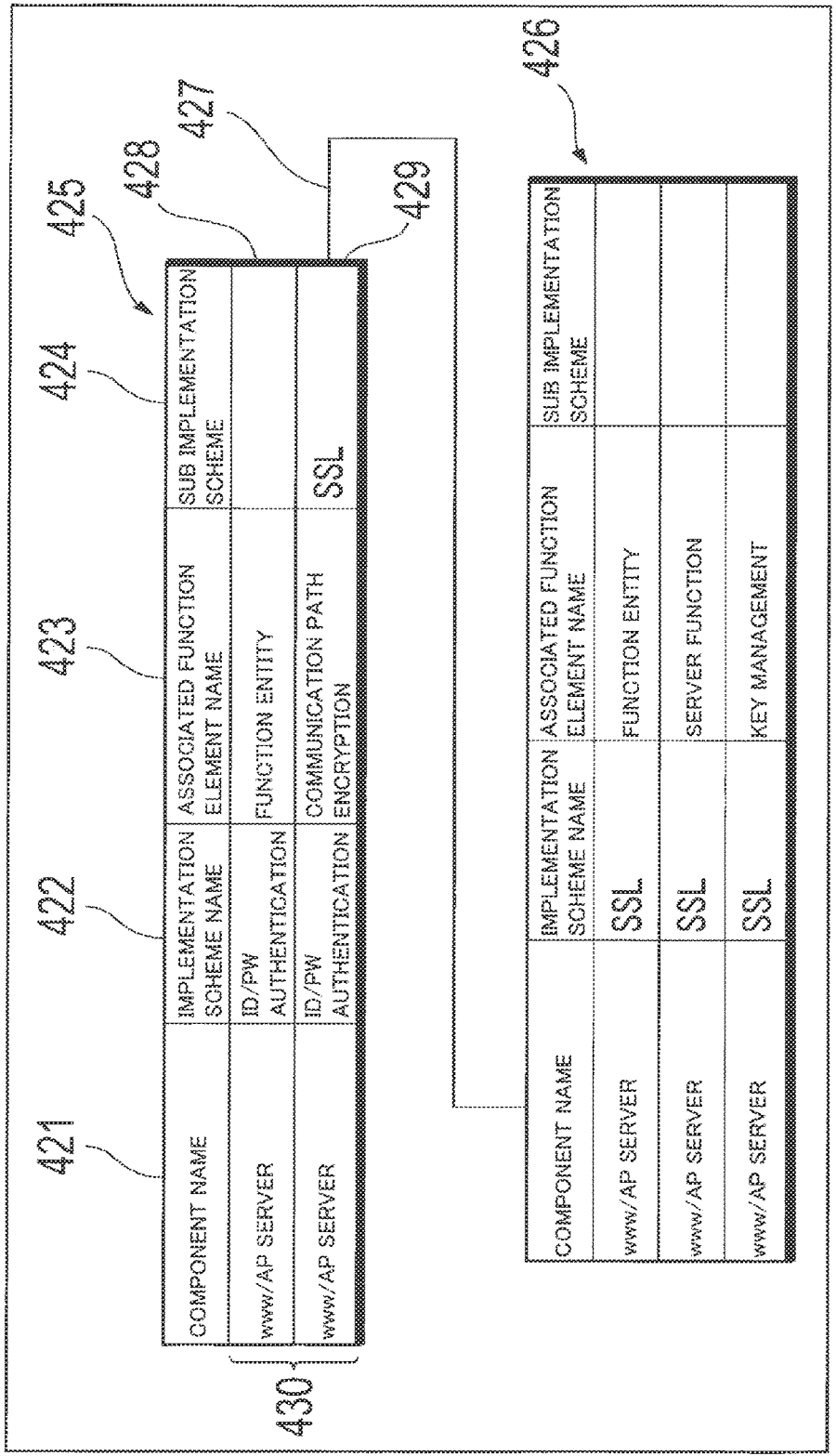
FIG. 4 is a diagram illustrating an example of data stored in an associated function element storage unit according to the exemplary embodiment of the present invention.

The associated function element storage unit 303 is configured for a component of the system and stores data of the associated function element configured for protecting a function to execute the security implementation scheme. FIG. 4 is a diagram illustrating an example of data stored in the associated function element storage unit 303. As illustrated in the FIG. 4, the associated function element storage unit 303 includes a table 425 which includes the component name 421, an implementation scheme name 422 of the security function arranged for the component, an associated function element name 423, and an implementation scheme (a sub implementation scheme) 424 of the security function to implement the associated function element.

The table 425 may have a hierarchical structure. For example, in case that the associated function element is implemented by other security implementation scheme, a table 426 is generated with a pertinent record 429 of the table 425 as a parent and a link structure 427 is configured such that the child table 426 can be followed from the parent record 429.

In the example shown in the FIG. 4, the ID/PW authentication is employed as the security implementation scheme for the WWW/AP server. "Function entity" and "communication path encryption" which are the associated function elements are arranged for the ID/PW authentication (table 425). Furthermore, since the communication path encryption is implemented by other security implementation scheme "SSL", SSL is registered as the sub implementation scheme 424. In addition, the link structure 427 is configured to the child table 426 with the record 429 as a parent. In the table 426, information on the associated function element of the security implementation scheme "SSL" is stored.

Figure 5:
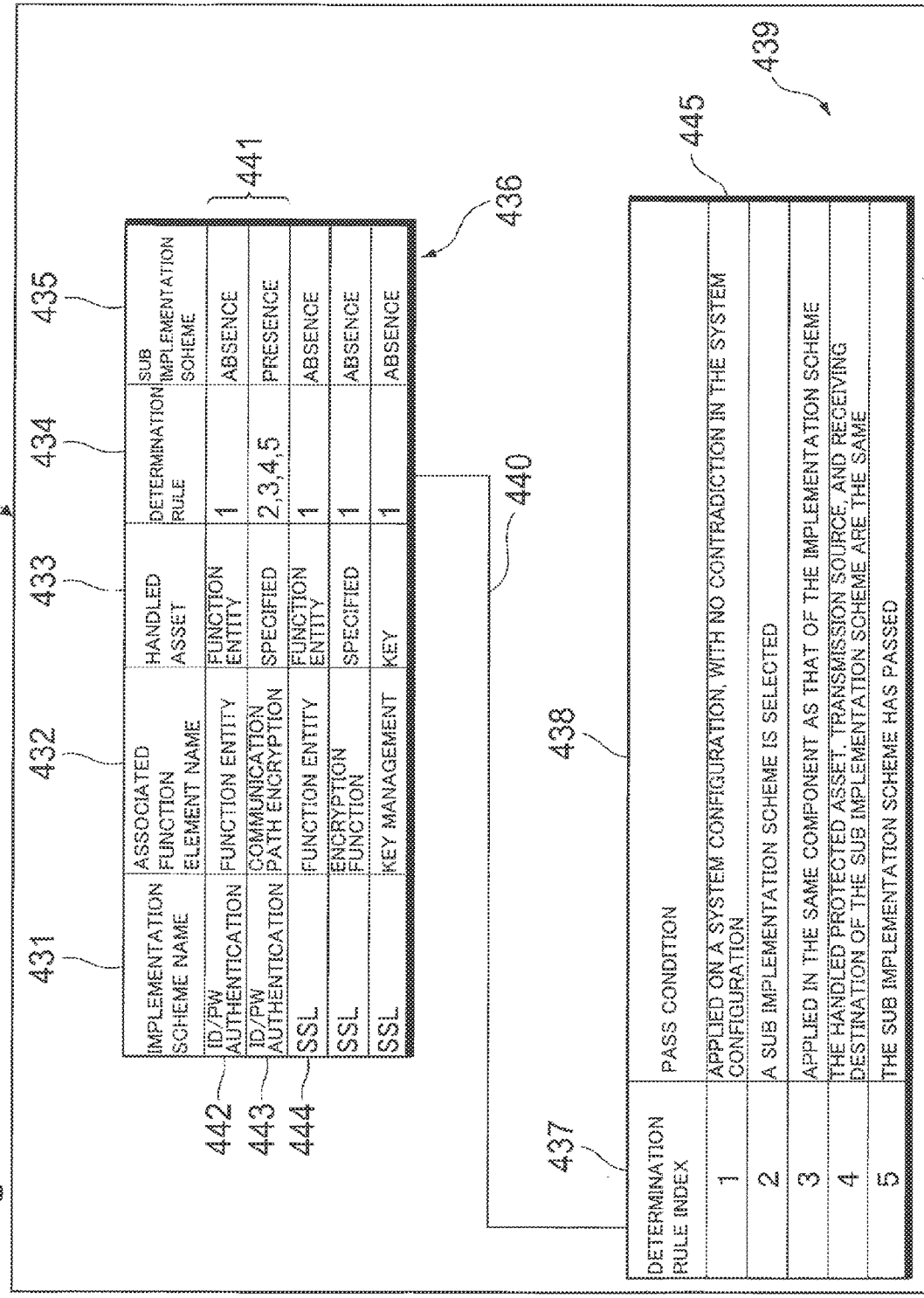
FIG. 5 is a diagram illustrating an example of data stored in an associated function element definition storage unit according to the exemplary embodiment of the present invention.

The associated function element definition storage unit 304 stores information on the associated function element for protecting the function to execute the certain security implementation scheme. FIG. 5 is a diagram illustrating an example of data stored in the associated function element definition storage unit 304. As illustrated in the FIG. 5, the associated function element definition storage unit 304 includes a table 436 which includes a security implementation scheme name 431, an associated function element name 432 for protecting the security implementation scheme, a protected asset name (handled asset) 433 handled by the associated function element, a determination rule 434 for determining pass or failure of the associated function element, and information (sub implementation scheme) 435 representing a presence or absence of other security implementation scheme for implementing the associated function element. A sub table 439 is linked to the determination rule 434. The sub table 439 includes a determination rule index 437 and a pass condition 438 and a link structure 440 is configured such that the sub table 439 can be followed from the determination rule 434.

In the example shown in the FIG. 5, for example, in the case of the ID/PW authentication, both of the function entity and the communication path encryption are defined as the associated functions. In view of a record 442 of being the function entity, the handled asset 433 is the function entity. This means the ID/PW authentication function itself which is the security implementation scheme. Note that, in case that the handled asset 433 is "specified", a protected asset specified by the implementation scheme storage unit 302 is devoted. With respect to the determination rule, for example, in case that "1" is set, a record in which the determination rule index 437 in the sub table 439 includes "1" is referred, following the link structure 440. In the example of the FIG. 5, "arranged on the system configuration, with no contradiction in the system configuration" becomes the determination rule. With respect to the sub implementation scheme 435, in the case of "presence", it denotes that the associated function is implemented by other implementation scheme and, in the case of "absence", it denotes that the associated function is not implemented by other implementation scheme.

(Operation of Security-Function-Design Support Device)

In the following, an operation of the security-function-design support device according to the exemplary embodiment of the present invention will be described.

The system configuration data of a target system is stored in the system configuration data storage unit 301. Furthermore, definition information of the associated function elements defined based on various security definitions is stored in the associated function element definition storage unit 304.

Figure 6:
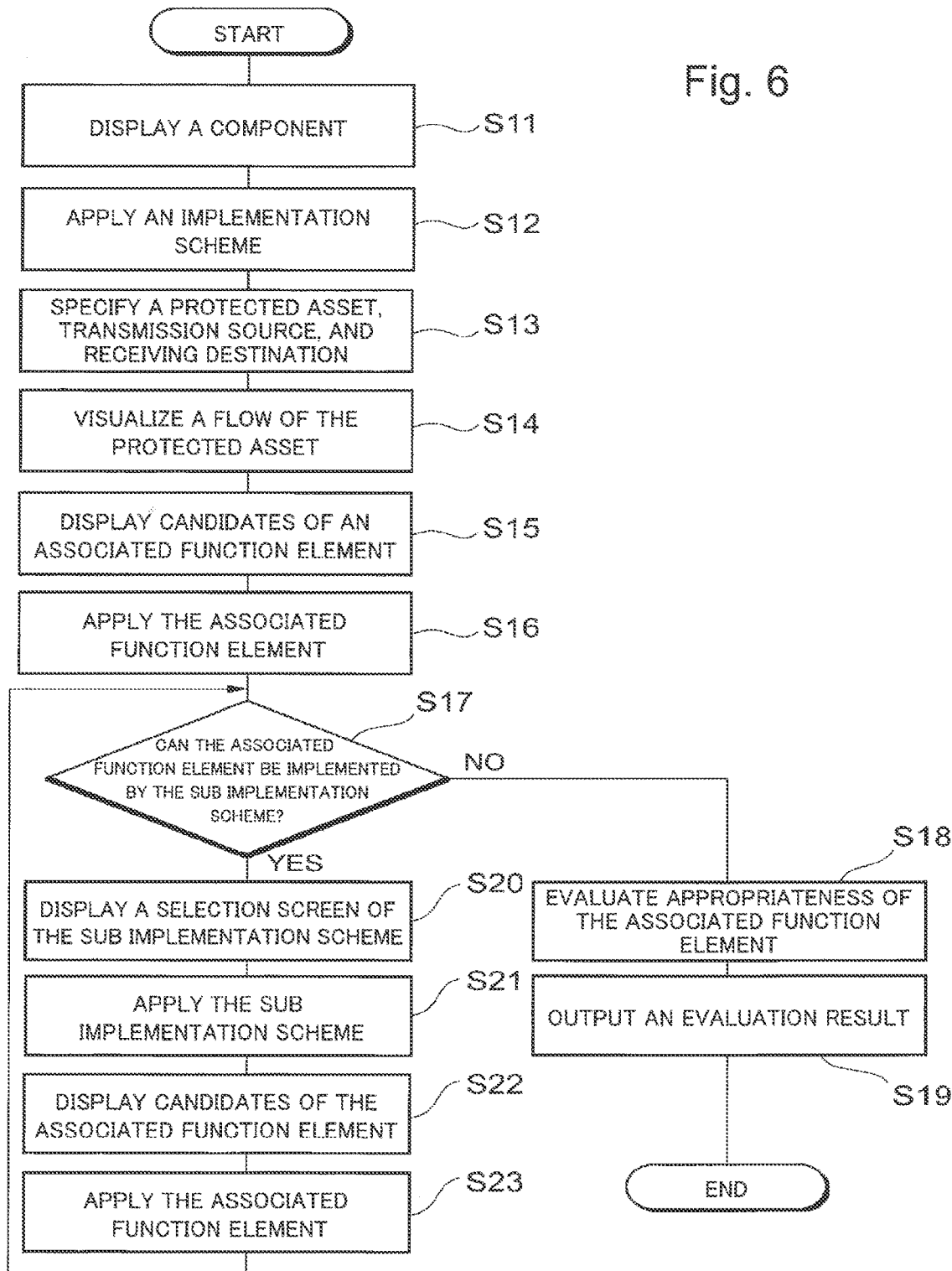
FIG. 6 is a flowchart describing an operation example of the security-function-design support device according to the exemplary embodiment of the present invention.

FIG. 6 is a flowchart describing an operation of the security-function-design support device 100 according to the exemplary embodiment 1. FIGS. 7 to 17 are diagrams illustrating examples of screens displayed on the display device 130.

First, the system configuration data display unit 111 refers to the system configuration data storage unit 301 and displays the system configuration in the display device 130 (step S11).

Next, the implementation scheme configuration support unit 112 applies the implementation scheme for the component of the system based on an operation performed by a user using the input device 140 (step S12). The applied implementation scheme is registered in the implementation scheme storage unit 302.

Figure 7:
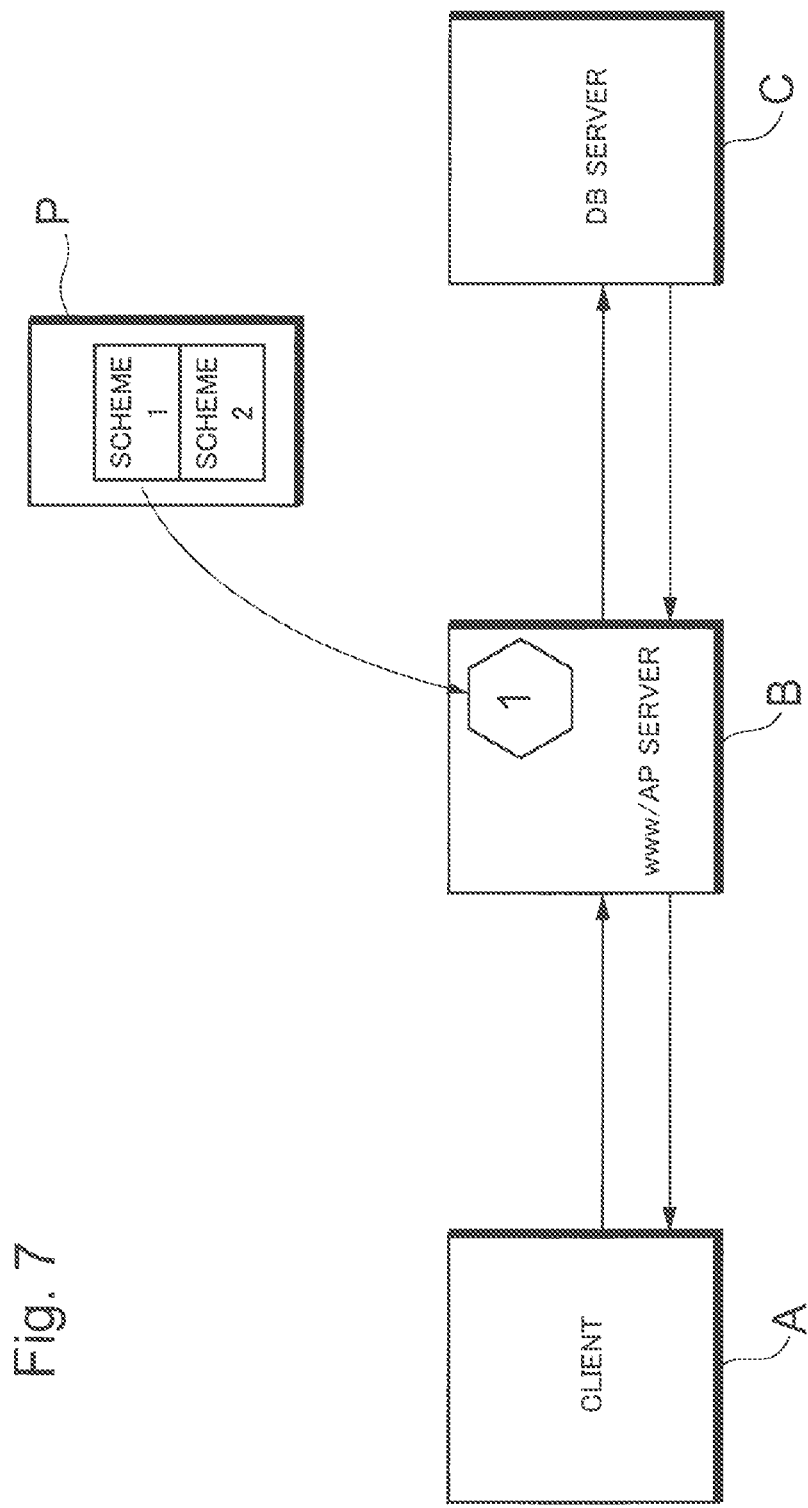
FIG. 7 is a diagram illustrating an example of a screen displayed on a display device according to the exemplary embodiment of the present invention.

FIG. 7 illustrates an example of a screen of the display unit 130 in steps 11 and 12. As illustrated, a client (A), a WWW/AP server (B), and a DB server (C) which are components of the system are displayed in the screen. In addition, connection relationships among each of the components are illustrated with arrows.

The user specifies a desired implementation scheme (scheme 1) from a list (P) denoting a list of the implementation schemes using the input device 140 and performs a drag and drop. This operation applies the scheme 1 in the WWW/AP server as illustrated in the FIG. 7.

Next, based on operations performed by the user using the input device 140, the implementation scheme configuration support unit 112 configures the protected asset, and the transmission source and the receiving destination of the protected asset in the implementation scheme arranged in step S12 (step S13). The protected asset and the transmission source and the receiving destination of the configured protected asset are registered in the implementation scheme storage unit 302.

Figure 8:
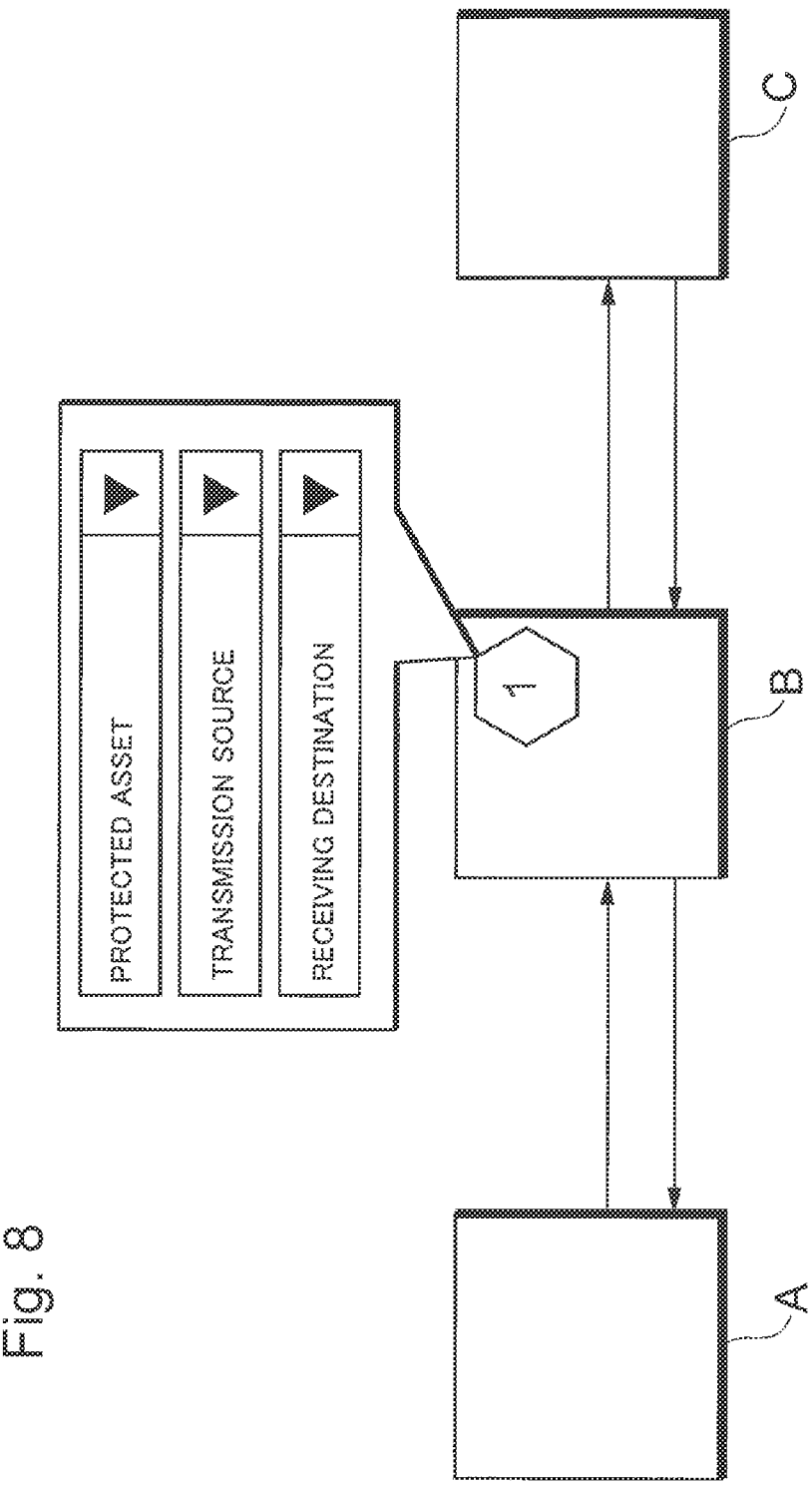
FIG. 8 is a diagram illustrating an example of a screen displayed on the display device according to the exemplary embodiment of the present invention.

FIG. 8 illustrates an example of the screen of the display unit 130 in step S13. The user selects the desired protected asset, the transmission source, and the receiving destination using the input device 140 from a list box denoting a list of the protected assets and the transmission sources and the receiving destinations of the protected assets. Each choice may be presented based on a content of the system configuration data storage unit 301.

Next, based on the information configured in step S13, the implementation scheme configuration support unit 112 displays a flow of the protected asset (information) among the components (step S14).

Figure 9:
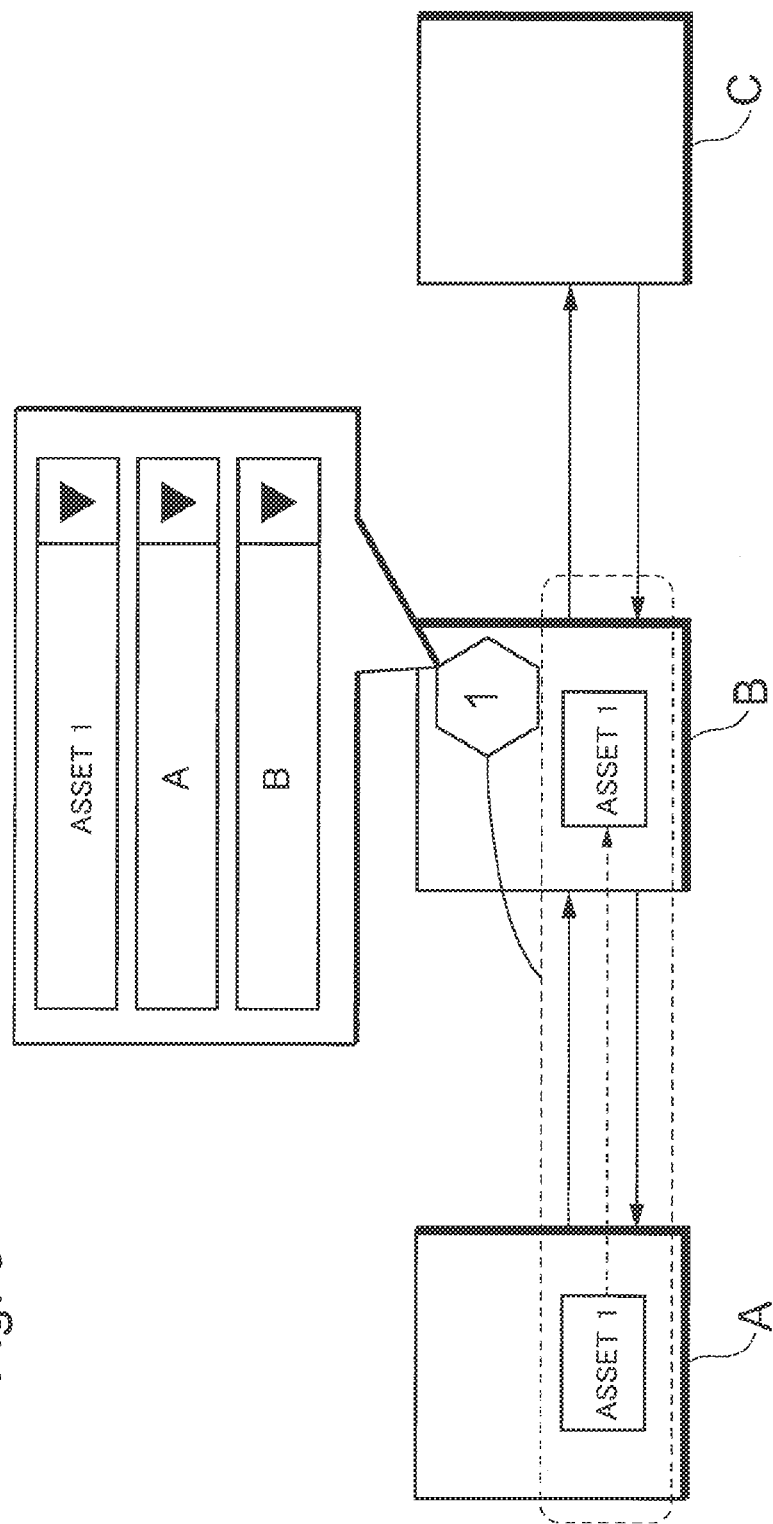
FIG. 9 is a diagram illustrating an example of a screen displayed on the display device according to the exemplary embodiment of the present invention.

FIG. 9 illustrates an example of the screen of the display unit 130 in step S14. As illustrated in the FIG. 9, it is denoted by a dotted arrow that "asset 1" specified by the user is transmitted from the client to the WWW/AP sever.

Next, the associated function element configuration support unit 113 displays candidates of the associated function element on the display unit 130 by referring to the associated function element definition storage unit 304 (step S15).

Figure 10:
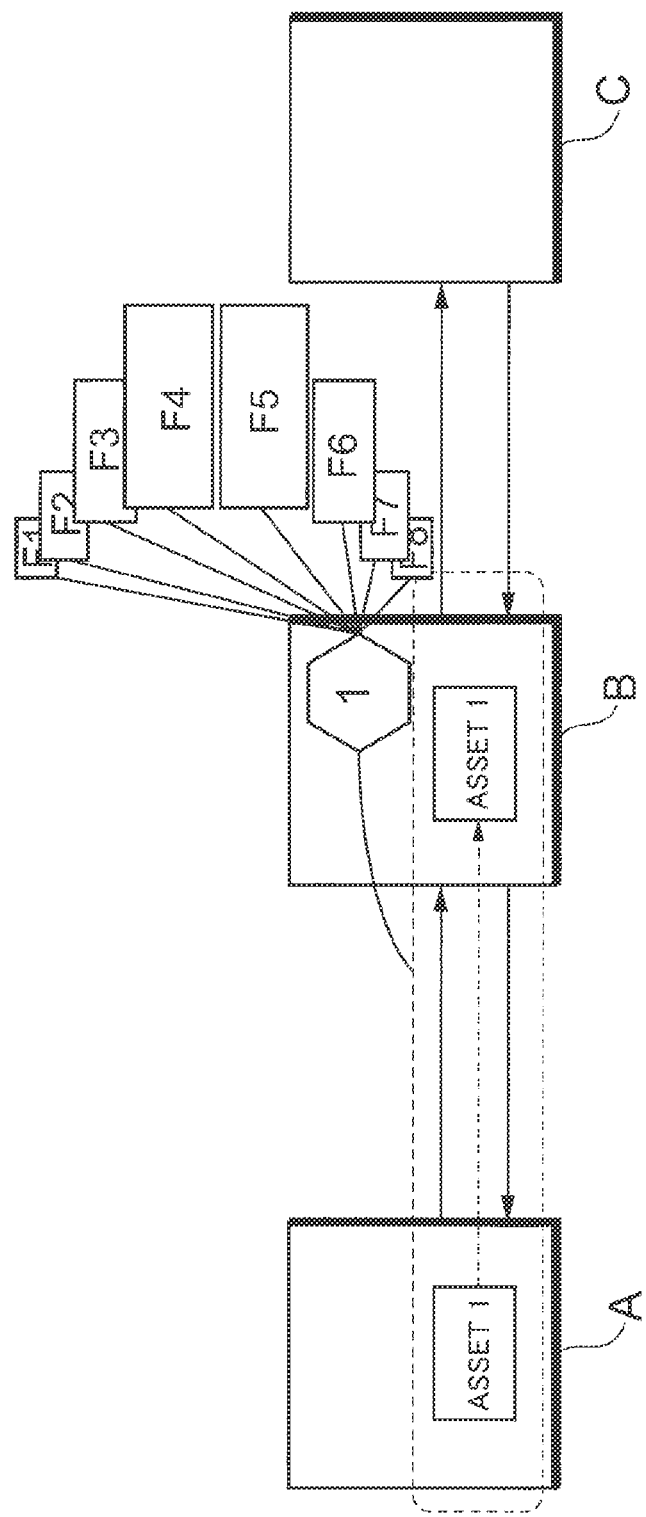
FIG. 10 is a diagram illustrating an example of a screen displayed on the display device according to the exemplary embodiment of the present invention.

FIG. 10 illustrates an example of the screen of the display unit 130 in step S15. As illustrated, candidates F1 to F8 of the associated function element are displayed. In case that a number of candidates of the associated function element are large, specific elements (F4 and F5 in the FIG. 9) may be largely displayed based on operations of the input device 140. For example, elements to be largely displayed may be changed by turning a mouse wheel.

Next, the associated function element configuration support unit 113 configures the associated function element based on operations performed by the user using the input device 140 (step S16).

Figure 11:
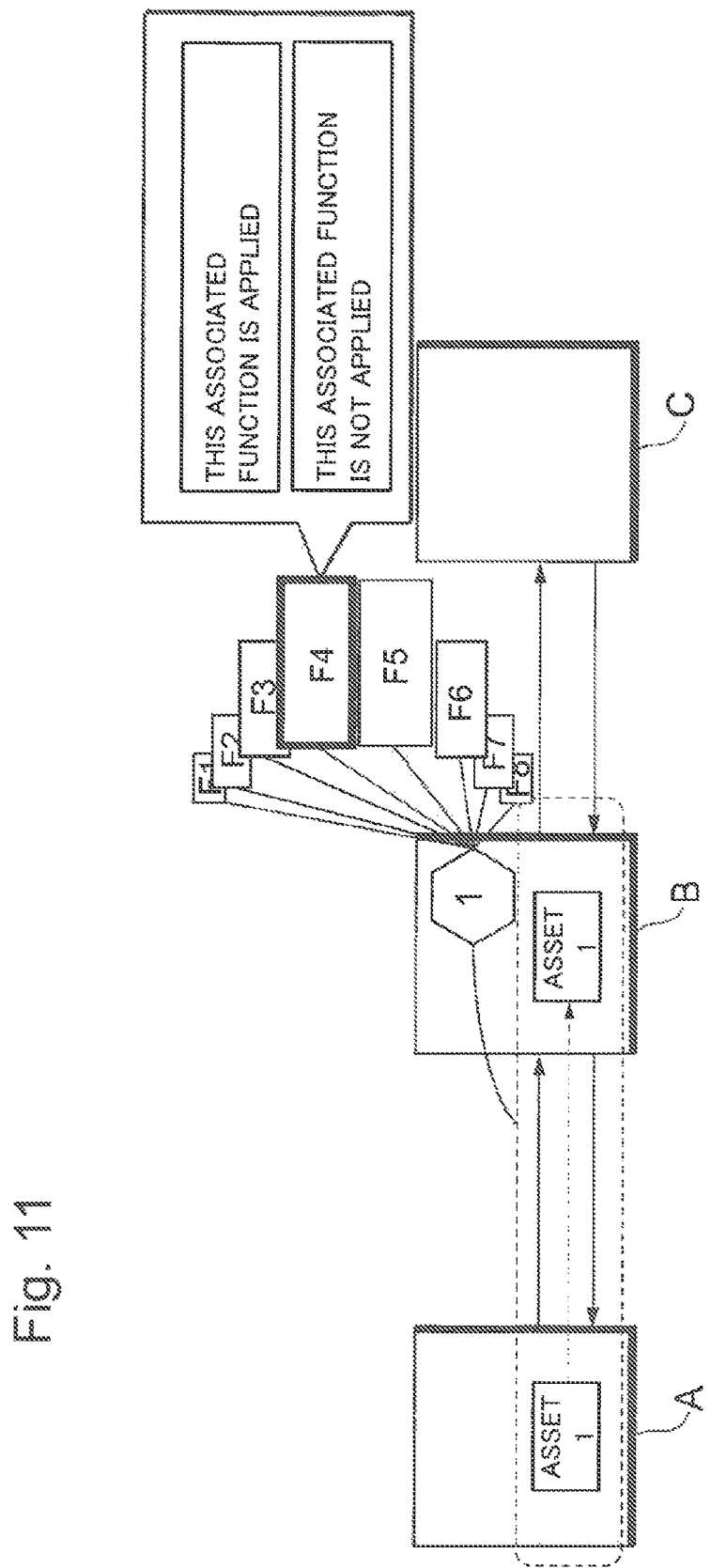
FIG. 11 is a diagram illustrating an example of a screen displayed on the display device according to the exemplary embodiment of the present invention.
Figure 12:
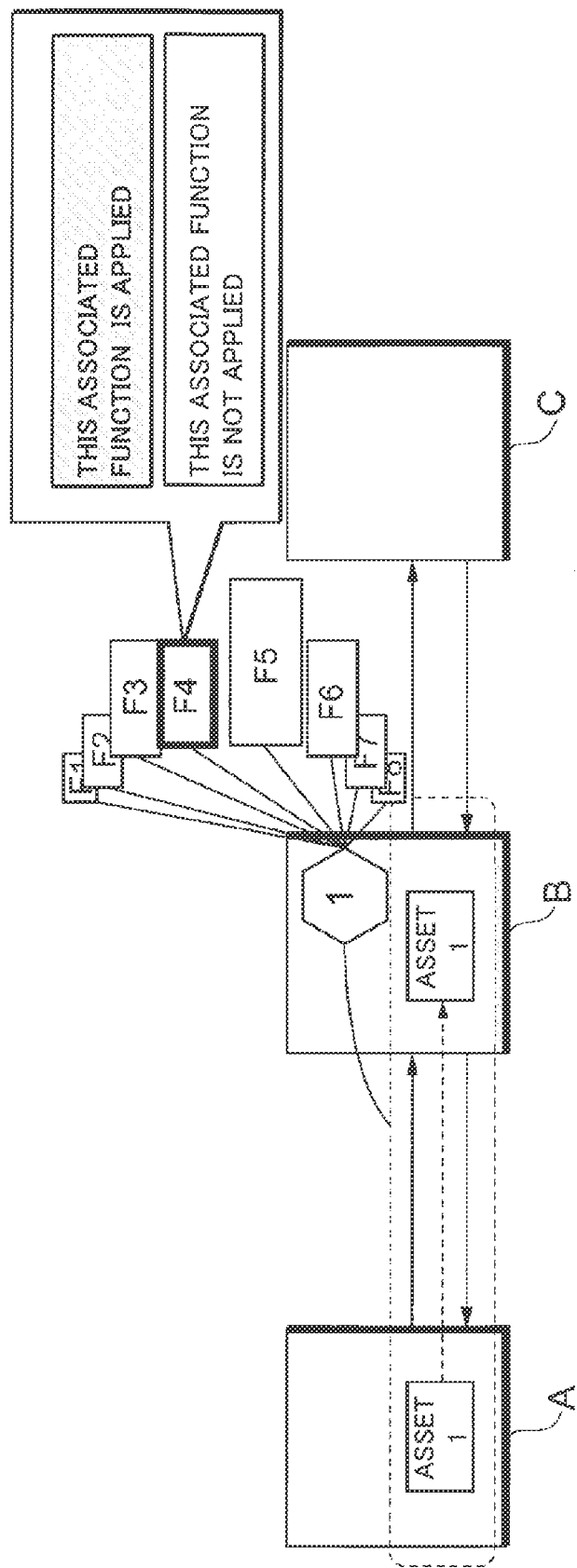
FIG. 12 is a diagram illustrating an example of a screen displayed on the display device according to the exemplary embodiment of the present invention.

FIGS. 11 and 12 illustrate examples of the screens of the display unit 130 in step S16. In case that the user selects a specific associated function element (F4) using the input device 140, a dialog to select whether or not the associated function element is applied is displayed (FIG. 11). In case that the user selects "not applied", the associated function element is displayed small (FIG. 12). In case that "applied" is selected, the selected associated function element is registered in the implementation scheme storage unit 302 and the associated function element storage unit 303.

Next, the associated function element configuration support unit 113 determines whether or not there is other implementation scheme (sub implementation scheme) to implement the associated function element selected in step S16 by referring to the associated function element definition storage unit 304 (step S17).

Figure 13:
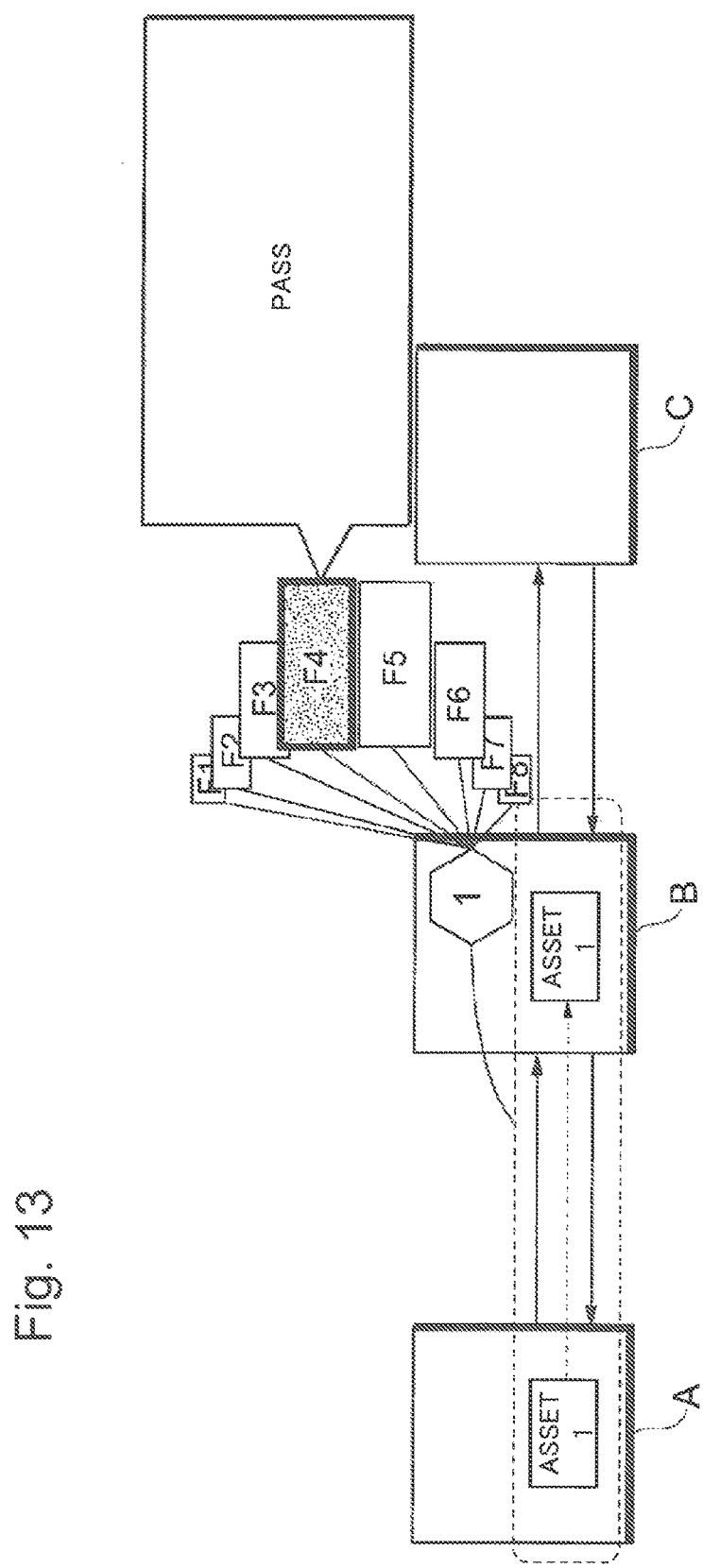
FIG. 13 is a diagram illustrating an example of a screen displayed on the display device according to the exemplary embodiment of the present invention.

In case that there are no sub implementation schemes (NO), step S18 is proceeded to and the associated function element evaluation unit 114 evaluates appropriateness of the configured associated function element. An evaluation process of the associated function element will be described later. When the evaluation process is finished, step S19 is proceeded to and the evaluation result output unit 115 outputs an evaluation result. In case that the result is pass, it is displayed that the configured associated function element is pass as illustrated in FIG. 13.

Figure 14:
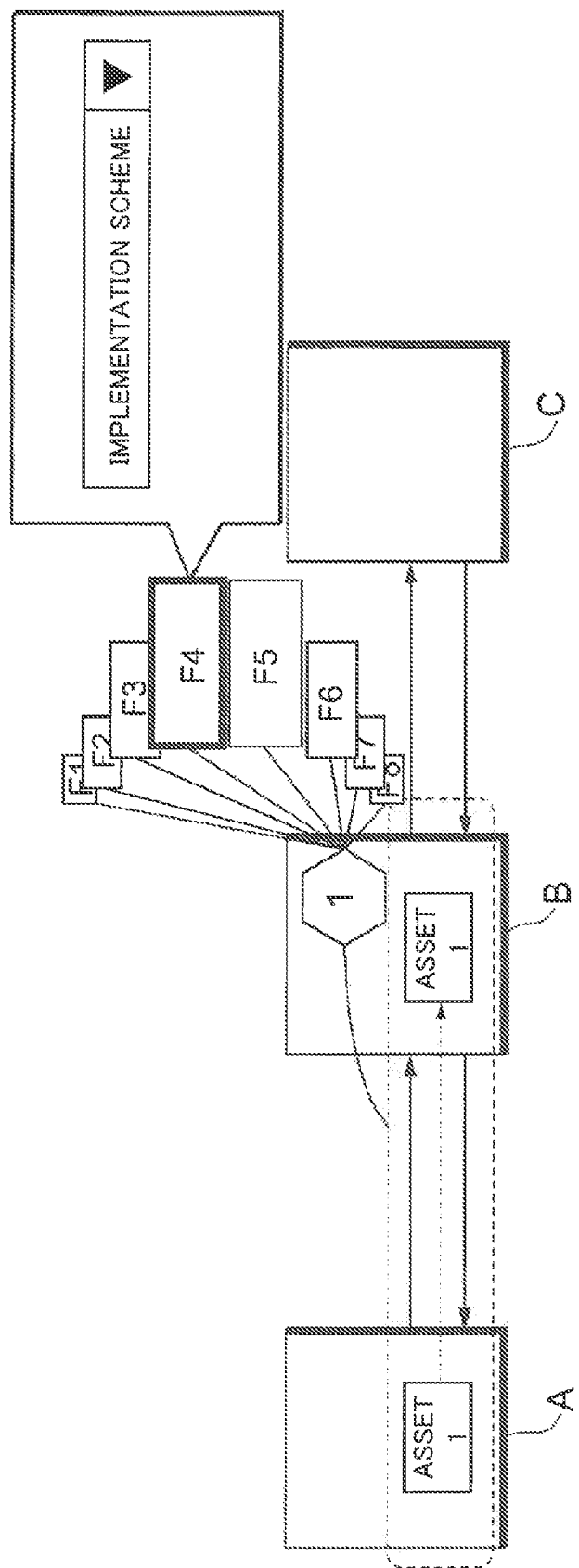
FIG. 14 is a diagram illustrating an example of a screen displayed on the display device according to the exemplary embodiment of the present invention.

In case that it is determined that the sub implementation scheme exists in the step S17 (YES), step S20 is proceeded to. In the step 20, the implementation scheme configuration support unit 112 displays choices of sub implementation schemes using a list box or the like as illustrated in FIG. 14.

Figure 15:
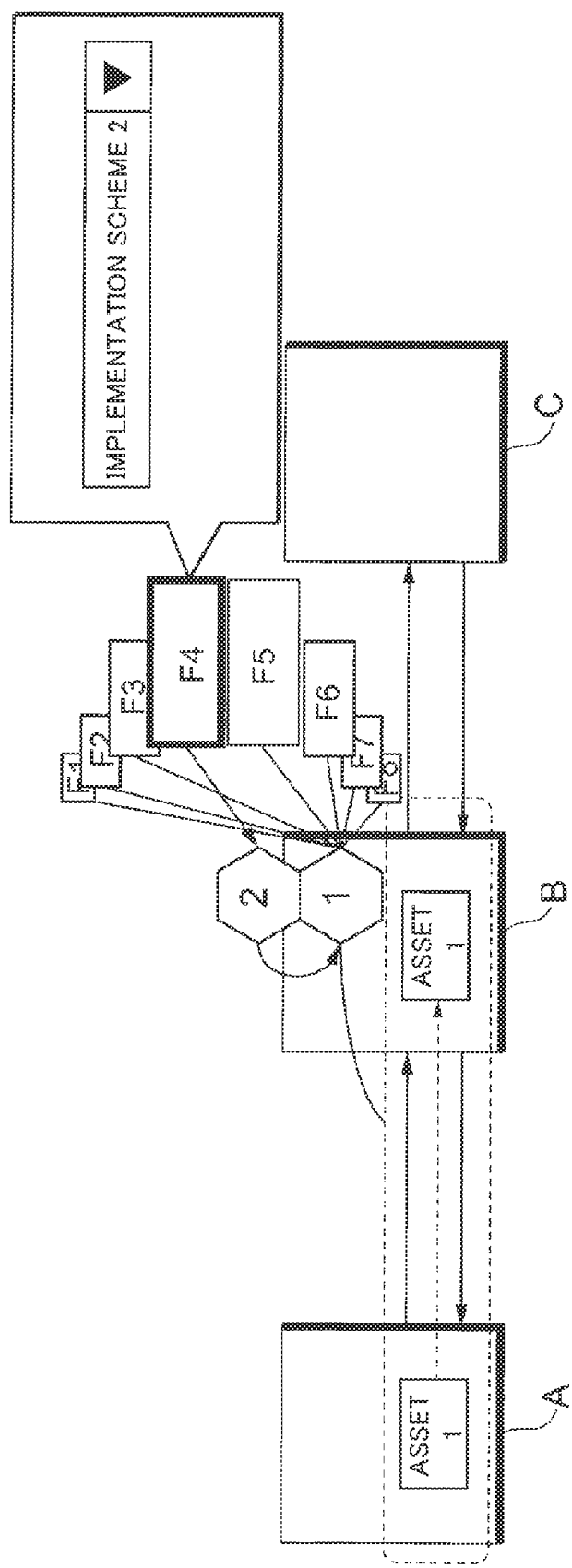
FIG. 15 is a diagram illustrating an example of a screen displayed on the display device according to the exemplary embodiment of the present invention.

Next, in step S21, the implementation scheme configuration support unit 112 configures a sub implementation scheme. As illustrated in FIG. 15, in case that a sub implementation scheme (implementation scheme 2) is selected by the user, "scheme 2" is applied in the WWW/AP server. Furthermore, a parent-child relationship (the scheme 1 is a parent and the scheme 2 is a child) with "scheme 1" is indicated by an arrow. In case that the sub implementation scheme is selected, information in the implementation scheme storage unit 302 and the associated function element storage unit is updated.

Figure 16:
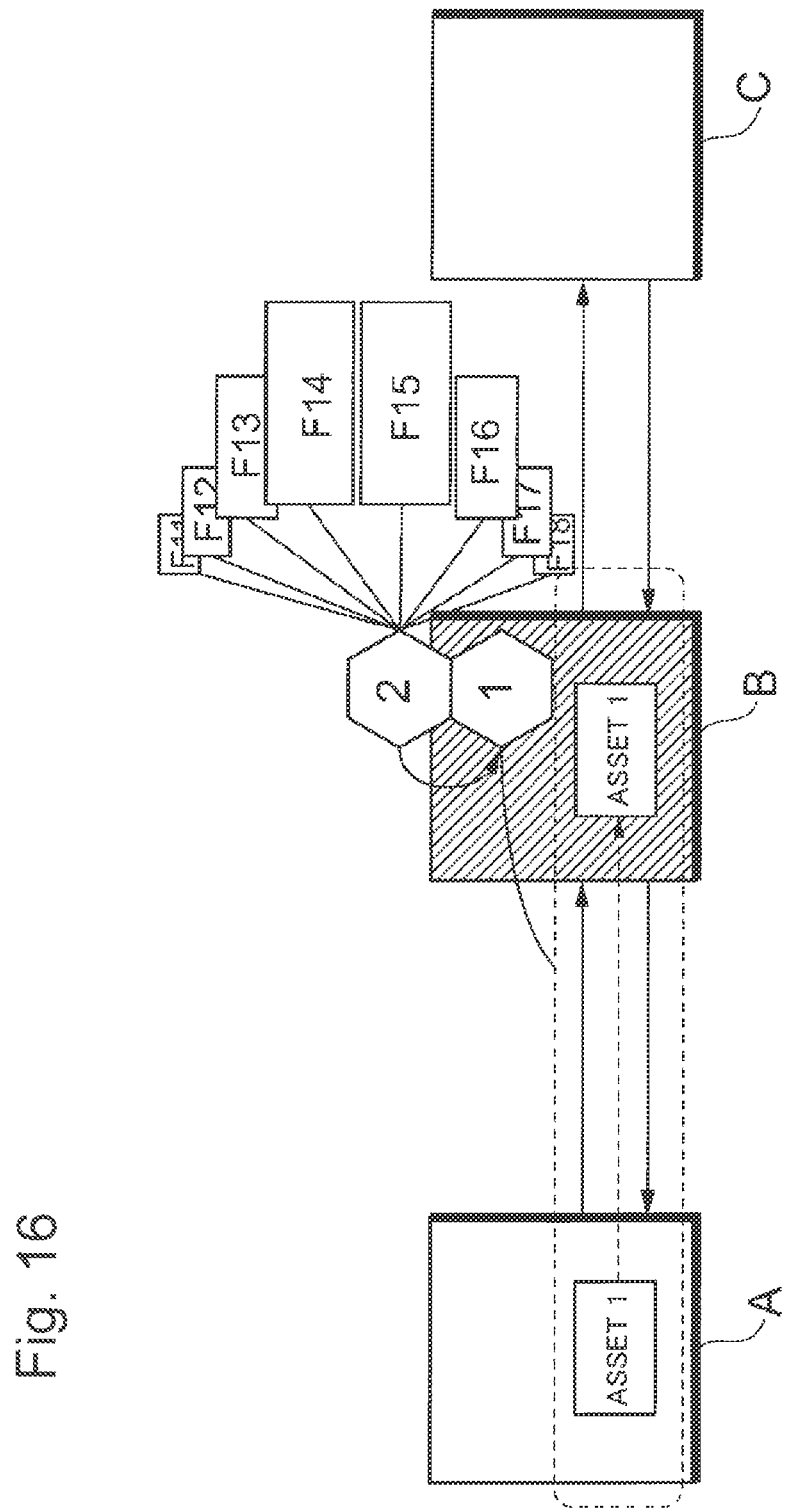
FIG. 16 is a diagram illustrating an example of a screen displayed on the display device according to the exemplary embodiment of the present invention.

Next, in step S22, the associated function element configuration support unit 113 displays on the display unit 130, candidates of the associated function element for the sub implementation scheme configured in the step S21 (FIG. 16).

Figure 17:
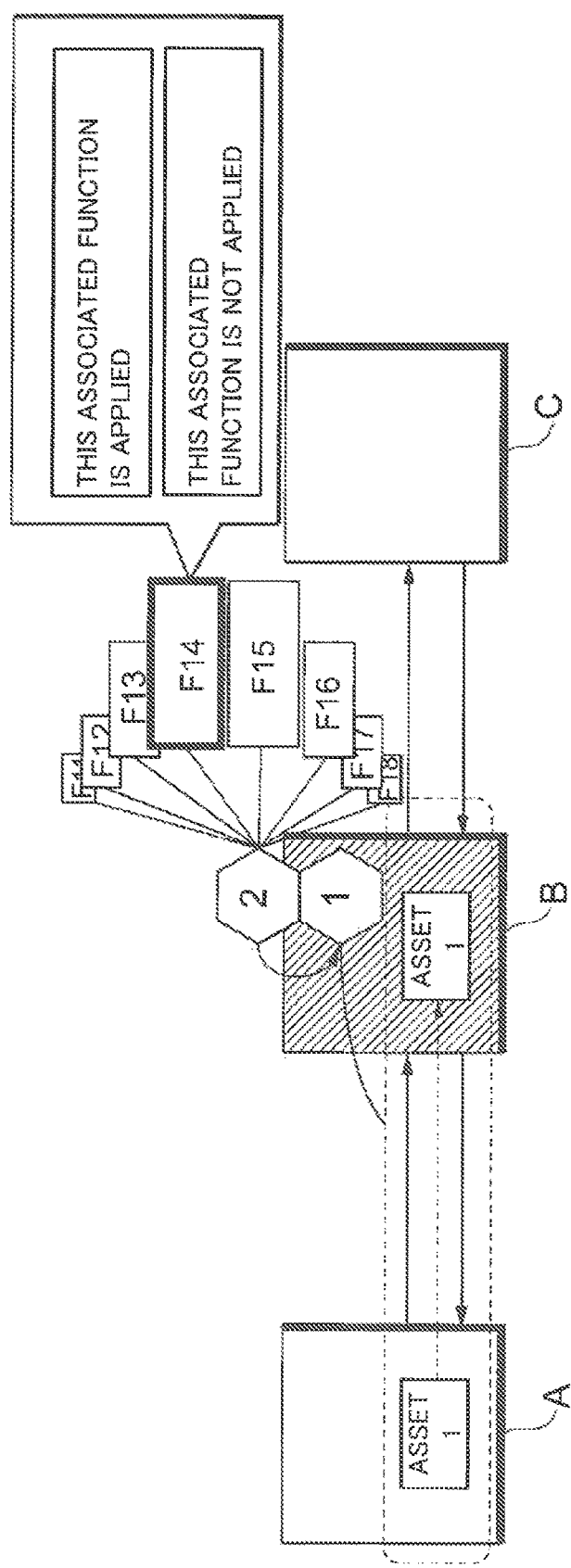
FIG. 17 is a diagram illustrating an example of a screen displayed on the display device according to the exemplary embodiment of the present invention.

Next, in step S23, the associated function element configuration support unit 113 configures the associated function element based on operations performed by the user using the input device 140. As illustrated in FIG. 17, in case that the user selects a specific associated function element (F14) using the input device 140, a dialog for selecting whether or not the associated function element is applied is displayed. In case that the user selects "not applied", the associated function element is displayed small, and in case that "applied" is selected, the implementation scheme storage unit 302 and the associated function element storage unit 303 are updated. Thereafter, upon returning to the step S17, the process is repeated.

Figure 18:
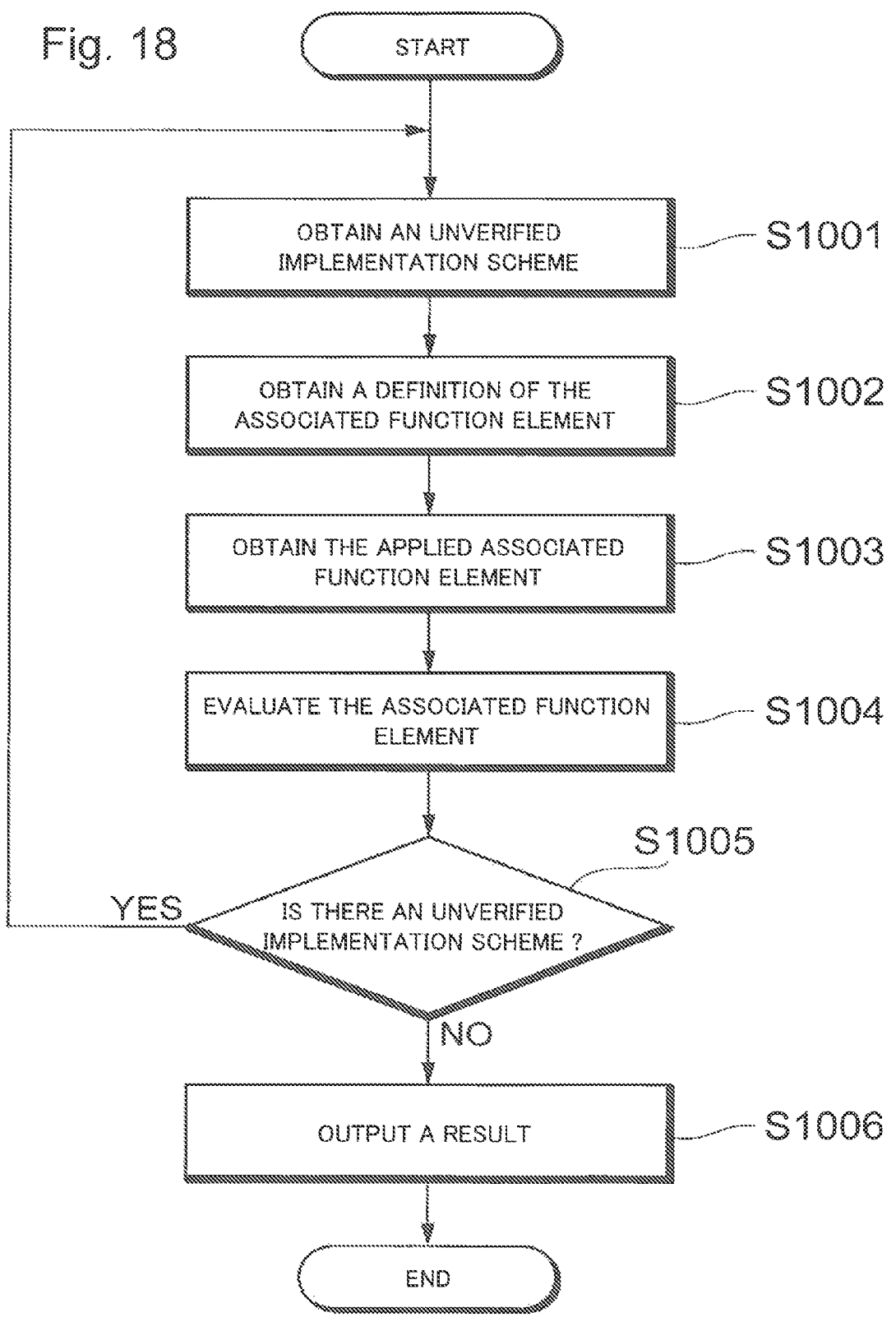
FIG. 18 is a flowchart describing an operation example of evaluating the associated function element according to the exemplary embodiment of the present invention.
Figure 19:
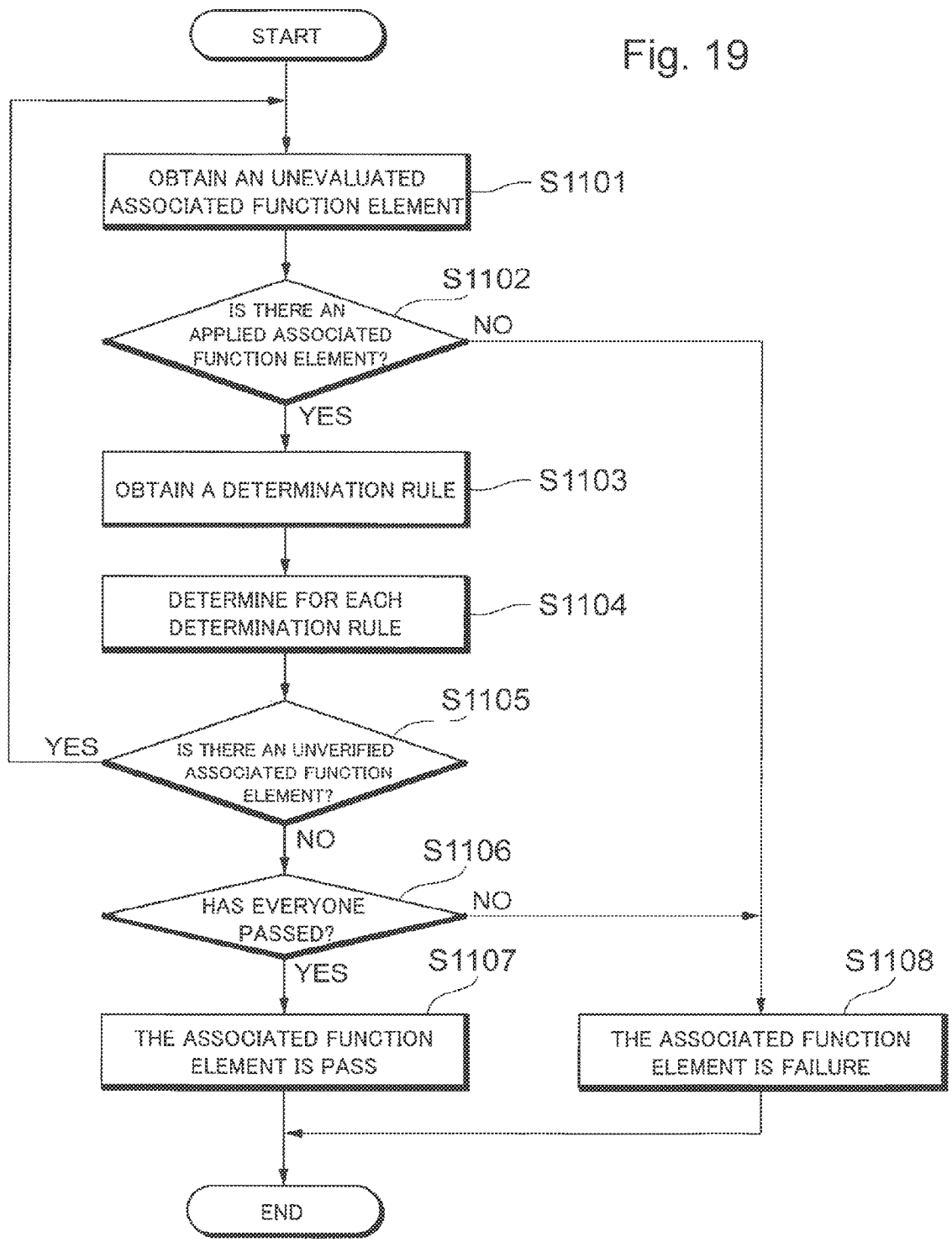
FIG. 19 is a flowchart of an operation of evaluating the associated function element according to the exemplary embodiment of the present invention.

Next, evaluation of the associated function elements by the associated function element evaluation unit 114 will be explained in detail with reference to flowcharts of FIGS. 18 and 19. It will be explained assuming that data of contents indicated in FIGS. 3 and 4 has been registered in the implementation scheme storage unit 302 and the associated function element storage unit 303 by processes of the steps S12 to S23.

First, the associated function element evaluation unit 114 obtains one of unverified implementation schemes from the implementation scheme storage unit 302 (step S1001). In particular, an unverified record 418 (hereinafter, referred to as an implementation scheme record employed for a component) is selected from the table 415 illustrated in the FIG. 3.

Next, the associated function element evaluation unit 114 obtains a definition record of the associated function element of the implementation scheme selected in the step S1001 from the associated function element definition storage unit 304 (step S1002). For example, in case that the implementation scheme name 412 employed by the record obtained in the step S1001 is "ID/PW authentication", a record group 441 (hereinafter, referred to as associated function element definition record group) including record in which the implementation scheme name 431 is "ID/PW authentication" is obtained from the table 436 illustrated in the FIG. 5.

Next, the associated function element evaluation unit 114 obtains from the table 425 of the associated function element storage unit 303, a record group (hereinafter, referred to as arranged associated function element definition record group) including record having a content of the implementation name 422 which is the same as that of the implementation scheme name 412 employed by the record obtained in the step S1001 (step S1003). In particular, in case that the implementation scheme name 412 employed by the record obtained in the step S1001 is "ID/PW authentication", the record group 430 illustrated in the FIG. 4 is obtained.

Next, the associated function element evaluation unit 114 evaluates the associated function element based on data obtained in the step S1002 and the step S1003 (step S1004).

A process of the step S1004 is described in detail with reference to a flowchart of FIG. 19.

First, the associated function element evaluation unit 114 obtains one record (hereinafter, referred to as an evaluation target associated function element record) from the associated function element definition record group obtained in the step S1002 of the FIG. 6 (step S1101).

Next, the associated function element evaluation unit 114 determines whether or not there exists, in the applied associated function element definition record group obtained in the step S1003, a record (hereinafter, referred to as an already-applied associated function element record) in which the implementation scheme name 422 and the associated function element name 423 coincide the implementation scheme name 431 and the associated function element name 432 of the evaluation target associated function element record obtained in the step S1101 (step S1102). The associated function element evaluation unit 114 proceeds to step S1103 in case that the already-applied associated function element record exists and proceeds to step S1108 in case that it does not exist.

Description will be given specifically with reference to FIGS. 4 and 5. In the step S1101, an evaluation target associated function element record 442 is selected. The implementation scheme name 431 of the record 442 is "ID/PW authentication" and the associated function element name 432 is a "function entity". The associated function element evaluation unit 114 selects the record having the same content as the above in the implementation scheme name 422 and the associated function element name 423 from the arranged associated function element record group obtained in the step S1003. In the example of the FIG. 4, a record 428 corresponds thereto. Accordingly, the record 428 becomes the already-applied associated function element record.

In step S1103, the associated function element evaluation unit 114 follows the link structure 440 based on the determination rule 434 of the evaluation target associated function element record obtained in the step S1101 and obtains, from the table 439, one or more records (hereinafter, referred to as determination rule record group) in which pass conditions is described.

Description will be given specifically with reference to the FIG. 5. The determination rule 434 of the record 442 obtained in the step S1101 is "1". By following the link structure 440, the associated function element evaluation unit 114 obtains, from the table 439, a record 445 whose content of the determination rule index 437 is the same as that of the determination rule 434. The associated function element evaluation unit 114 obtains, as the determination rule, a content "it is applied on a system configuration and there is no contradiction in the system configuration" of the pass condition 438 of the record 445.

Next, the associated function element evaluation unit 114 determines pass or failure of the associated function element based on the determination rule obtained in the step S1103. In case that a plurality of determination rules exists, all of the determination rules is evaluated (step S1104).

The determination of pass or failure of the associated function element is specifically described with reference to FIGS. 4 and 5. In the step S1101, the evaluation target associated function element record 442 is obtained and in the step S1102, the already-applied associated function element record 428 is obtained. In addition, in the step S1103, the record 445 is obtained as the determination rule record group. As a result, there is only one determination rule which is "applied on the system configuration, with no contradiction in the system configuration".

"Applied on the system configuration, with no contradiction in the system configuration" means that pass is given if the already-applied associated function element record exists, the component name 411 of the record obtained in the step S1001 exists in the component name 401 of the system configuration data storage unit 301, and the transmission source 413 of the protected asset and the receiving destination 414 of the protected asset allow to communicate.

Here, the component name 421 of the already-applied associated function element record 428 is "WWW/AP server". Referring to the system configuration data storage unit 301 in the FIG. 2, a record with the component name 401 of "WWW/AP server" exists. Furthermore, since "client" and "WWW/AP server" are connected with reference to the FIG. 2, they allow to communicate.

In case that the evaluation target associated function element record 443 is obtained in the step S1101, the already-applied associated function element record 429 is obtained in the step S1102. Since the determination rule 434 of the record 443 is "2, 3, 4, 5", "the sub implementation scheme is selected", "applied in the same component as that of the implementation scheme", "the handled protected asset, transmission source, and receiving destination of the sub implementation scheme are the same", and "the sub implementation scheme has passed" are obtained as determination rules in the step S1103.

The associated function element evaluation unit 114 performs evaluation based on each determination rule. First, evaluation of "the sub implementation scheme is selected" will be described. SSL is configured in the sub implementation scheme 424 of the record 429. In this case, the associated function element evaluation unit 114 follows the link structure 417 from the implementation scheme record 418 employed for the component to the child-table 416. In case that a record (hereinafter, referred to as sub implementation scheme record) in which the employed implementation scheme name 412 is "SSL" exits in the child table 416, pass is set.

Next, evaluation of "applied in the same component as that of the implementation scheme" will be described. The associated function element evaluation unit 114 follows the link structure 417 from "the implementation scheme record (418) employed by the component" obtained in the step S1001 to the child-table 416. In case that the record having the same implementation scheme name 422 as the sub implementation scheme name 424 of "the already-applied associated function element record (429)" exits in the child table 416, it is determined as pass.

Next, evaluation of "the handled protected asset, transmission source, and receiving destination of the sub implementation scheme are the same" will be explained. First, in case that the handled asset 433 of "the evaluation target associated function element record (443)" is "specified", the associated function element evaluation unit 114 sets it to the same vale as the protected asset described in the handled protected asset 420 of "the implementation scheme record (418) employed by the component". For example, in case that this value is "ID/PW", it is determined as pass if the implementation scheme name 412 of "the sub implementation scheme record (419)" is "ID/PW" and the transmission source 413 of the protected asset and the receiving destination 414 of the protected asset of "the sub implementation scheme record (419)" are the same as the transmission source 413 of the protected asset and the receiving destination 414 of the protected asset of "the implementation scheme record (418) employed by the component".

Next, evaluation of "the sub implementation scheme has passed" will be explained. Having performed operations from the step S1001 with the implementation scheme to be verified as SSL, pass is set if the result is determined as pass.

Note that the determination rules are not limited to those listed in the FIG. 5.

In the step S1105, the associated function element evaluation unit 114 proceeds to the step S1101 in case that there are unevaluated associated function elements among "the associated function element definition record group" obtained in the step S1002. In case that there are no unevaluated associated function elements, the associated function element evaluation unit 114 proceeds to the step S1106.

In the step S1106, the associated function element evaluation unit 114 proceeds to the step S1107 in case that evaluation of every associated function element is pass and proceeds to the step S1108 in case that there is a failed associated function element.

In step S1107, the associated function element evaluation unit 114 terminates the process by determining that design of the associated function element with regards to the implementation scheme is appropriate (step S1107).

In step S1108, the associated function element evaluation unit 114 terminates the process by determining that design of the associated function element with regards to the implementation scheme is not appropriate (step S1108).

Returning to the step S1005 in FIG. 18, the step S1001 is again proceeded to in case that there is an unverified implementation scheme. The step S1006 is proceeded to in case that every implementation scheme has been verified.

In the step S1006, the associated function element evaluation unit 114 outputs an evaluation result for each implementation scheme described in the implementation scheme storage unit 302.

This completes the evaluation process of the associated function element by the associated function element evaluation unit 114.

Note that, with regards to the evaluation result output of the step S19, for example, the security-function-design support device 100 may display the entire implementation scheme in a parent-child relationship in a specific color (green, etc.) in case that every associated function element is determined as pass. Thus, the user understands that the entire implementation scheme for implementing the security function is configured appropriately. In case that there is a failed associated function element, the security-function-design support device 100 displays it in another color (red, etc.).

In addition, the security-function-design support device 100 may alert an incorrect selection operation to the user during configuration. For example, in the FIG. 12 (the step S16), in case that the user selects "not applied" in spite of the associated function element being essential, the security-function-design support device 100 may display the associated function element and its target component in a specific color (yellow, etc.).

Furthermore, in the FIG. 16 (the step S22), since it becomes definite that configuration of the parent implementation scheme is insufficient at a stage that the child implementation scheme has been arranged, the security-function-design support device 100 may display the entire implementation scheme in the parent-child relationship in a color of failure (red, etc.) at this timing. Thus, it becomes clear which associated function element specifically has a problem in configuration of the security function and it becomes easier for the user to correspond thereto.

As described above, according to the present exemplary embodiment, the implementation scheme configuration support unit 112 and the associated function element configuration support unit 113 allow the user to visually perform the security function design, allow the associated function element evaluation unit 114 to determine appropriateness of the associated function element configured by the user, and allow the user to visually verify the determination result.

Thus, since the user can understand the configuration of which associated function element specifically has a problem, the security-function design can be efficiently performed.

Modified Example

Figure 20:
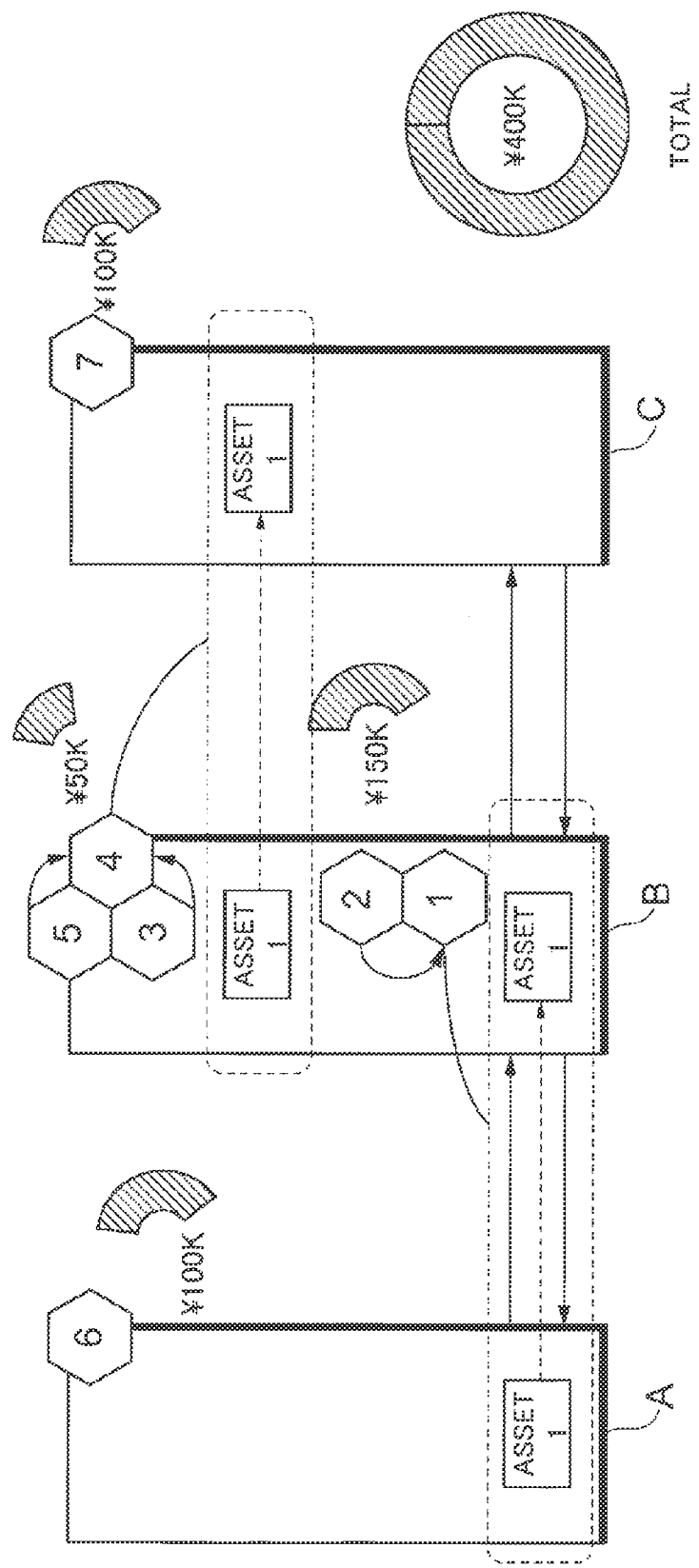
FIG. 20 is a diagram illustrating an example of a screen displayed on the display device according to a modified example of the present invention.

Note that, by registering a cost for each implementation scheme in advance, the security-function-design support device 100 may display the cost for each applied implementation scheme as illustrated in FIG. 20. In an example shown in the FIG. 20, the security-function-design support device 100 visually displays ratios of already-applied associated function elements using a pie chart, assuming that a case in which all necessary associated function elements are applied is 100%. By displaying in this way, the user can understand in what degree the associated function elements are missing. Furthermore, the security-function-design support device 100 may display missing associated function elements when a graph is clicked.

This application claims priority based on Japanese Patent Application No. 2012-228074, filed on Oct. 15, 2012, the entire disclosure of which is incorporated herein.

Although the invention of the present application has been explained with reference to the exemplary embodiments, the invention of the present application is not limited to the above exemplary embodiments. Various modifications that those skilled in the art can understand may be made to configurations and details of the invention of the present application within the scope of the invention of the present application.

INDUSTRIAL APPLICABILITY

The present invention may be applied, for example, to a security-function design at a time of design of a system development.

Some or all of the exemplary embodiments described above can be also described as in the following supplementary notes but are not limited to the following.

(Supplementary Note 1)

A security-function-design support device comprising:

a system configuration data display unit that displays a configuration of a system in a display device;

an implementation scheme configuration support unit that, in order to implement a security function, provides a candidate of a security implementation scheme configurable for a component of the system and configures a security implementation scheme selected by an operation of a user to a component selected by an operation of a user;

an associated function element configuration support unit that, in order to protect the security implementation scheme, provides a candidate of an associated function element configurable for a component of the system and configures an associated function element selected by an operation of a user to a component selected by an operation of a user;

an associated function element evaluation unit that determines whether or not the associated function element configured for the component of the system is appropriate based on a condition to determine appropriateness of the configuration of the certain associated function element; and an evaluation result output unit that outputs a result of the determination by the associated function element evaluation unit.

(Supplementary Note 2)

The security-function-design support device according to Supplementary Note 1, wherein the associated function element evaluation unit obtains data of the associated function element configured by a user operation and determines appropriateness of the associated function element with reference to information on system configuration data and the security implementation scheme configured by a user operation based on the condition for determining the appropriateness.

(Supplementary Note 3)

The security-function-design support device according to Supplementary Note 1 or 2, wherein the evaluation result output unit, in case that a user has not configured an essential associated function element, displays an image informing of being an essential element.

(Supplementary Note 4)

The security-function-design support device according to any one of Supplementary Notes 1 to 3, wherein the evaluation result output unit, in case that a sub implementation scheme required for functioning the associated function element is not configured, displays an image to inform of failure together with the implementation scheme in which the associated function element is configured.

(Supplementary Note 5)

The security-function-design support device according to any one of Supplementary Notes 1 to 4, wherein the evaluation result output unit displays information of a cost required for each configured implementation scheme.

(Supplementary Note 6)

A security-function-design support method comprising:

displaying a configuration of a system in a display device;

providing a candidate of a security implementation scheme configurable for a component of the system and configuring a security implementation scheme selected by an operation of a user to a component selected by an operation of a user in order to implement a security function;

providing a candidate of an associated function element configurable for a component of the system and configuring an associated function element selected by an operation of a user to a component selected by an operation of a user in order to protect the security implementation scheme;

determining whether or not the associated function element configured for the component of the system is appropriate based on a condition for determining appropriateness of configuring the associated function element; and outputting a result of the determination.

(Supplementary Note 7)

A program for causing a computer to function as:

a system configuration data display unit that displays a configuration of a system in a display device;

an implementation scheme configuration support unit that, in order to implement a security function, provides a candidate of a security implementation scheme configurable for a component of the system and configures a security implementation scheme selected by an operation of a user to a component selected by an operation of a user;

an associated function element configuration support unit that, in order to protect the security implementation scheme, provides a candidate of an associated function element configurable for a component of the system and configures an associated function element selected by an operation of a user to a component selected by an operation of a user;

an associated function element evaluation unit that determines whether or not the associated function element configured for the component of the system is appropriate based on a condition to determine appropriateness of the configuration of the certain associated function element; and an evaluation result output unit that outputs a result of the determination by the associated function element evaluation unit.

REFERENCE SIGNS LIST

100 Security-function-design support device
111 System configuration data display unit
112 Implementation scheme configuration support unit
113 Associated function element configuration support unit
114 Associated function element evaluation unit
115 Evaluation result output unit
130 Display device
140 Input device
301 System configuration data storage unit
302 Implementation scheme storage unit
303 Associated function element storage unit
304 Associated function element definition storage unit
401, 411, 421 Component name
402 Connection destination
412 Employed implementation scheme name
420 Handled protected asset
413 Transmission source of the protected asset
414 Receiving destination of the protected asset
415, 416, 425, 426, 436 Table
417, 427, 440 Link structure
418, 419, 428, 429, 442, 443, 444, 445 Record
422, 431 Implementation scheme name
423, 432 Associated function element name
424, 435 Sub implementation scheme
430, 441 Records
433 Handled asset
434 Determination rule
437 Determination rule index
438 Pass condition
439 Sub table

The invention claimed is:

1. A security-function-design support device comprising:
a memory storing instructions;
a processor, that when executing the instructions, configured to:
provide a candidate of a security implementation scheme configurable for a component of a system being targeted to a display device;
provide a candidate of an associated function element configurable for the component of the system to the display device;
determine whether the associated function element configurable for the component of the system using the candidate of the associated function element is appropriate based on a condition which determines whether the associated function element is appropriate for the component of the system;
output a result of the determination in order to display the result of the determination on the display device; and
display information of a cost required for the security implementation scheme configurable for the component of the system,
wherein, after determining that a sub implementation scheme required for the associated function is not configured, the processor controls the display device so as to display an image informing of failure with respect to the security implementation scheme including the associated function element for the component of the system.

2. The security-function-design support device according to claim 1, wherein the processor refers to further information on system configuration when determining whether the associated function element is appropriate for the component of the system.

3. The security-function-design support device according to claim 1, wherein, when the associated function element is not configured in spite of it being an essential element, the processor controls the display device so as to display an image which informs that the associated function element is not configured.

4. A security-function-design support method executed by a processor comprising:
providing a candidate of a security implementation scheme configurable for a component of a system of being targeted to a display device;
providing a candidate of an associated function element configurable for the component of the system to the display device;
determining whether the associated function element configurable for the component of the system using the candidate of the associated function element is appropriate based on a condition which determines whether the associated function element is appropriate for the component of the system;
displaying a result of the determination on the display device;
displaying information of a cost required for the security implementation scheme configurable for the component of the system; and
after determining that a sub implementation scheme required for the associated function element is not configured, controlling the display device so as to display an image informing of failure with respect to the security implementation scheme including the associated function element for the component of the system.

5. A non-transitory computer-readable medium storing a program for causing a computer to execute:
providing a candidate of a security implementation scheme configurable for a component of a system of being targeted to a display device;
providing a candidate of an associated function element configurable for the component of the system to the display device;
determining whether the associated function element configurable for the component of the system using the candidate of the associated function element is appropriate based on a condition which determines whether the associated function element is appropriate for the component of the system;
displaying a result of the determination on the display device;

displaying information of a cost required for the security implementation scheme configurable for the component of the system; and after determining that a sub implementation scheme required for the associated function element is not configured, controlling the display device so as to display an image informing of failure with respect to the security implementation scheme including the associated function element for the component of the system.

6. A security-function-design support device comprising:

implementation scheme configuration support means for providing a candidate of a security implementation scheme configurable for a component of a system being targeted to a display device;

associated function element configuration support means for providing a candidate of an associated function element configurable for the component of the system to the display device;

associated function element evaluation means for determining whether the associated function element configurable for the component of the system using the candidate of the associated function element is appropriate based on a condition which determines whether the associated function element is appropriate for the component of the system;

evaluation result output means for outputting a result of the determination in order to display the result of the determination on the display device, wherein, after a sub implementation scheme required for the associated function element is not configured, an image informing of failure with respect to the security implementation scheme including the associated function element for the component of the system is displayed, and wherein information of a cost required for the security implementation scheme configurable for component of the system is displayed.

* * * * *